United States Patent
Dudar

(10) Patent No.: US 10,428,725 B2
(45) Date of Patent: Oct. 1, 2019

(54) SYSTEMS AND METHODS FOR REDUCING ENGINE OVERHEATING USING LIQUID FUEL

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/832,025

(22) Filed: Dec. 5, 2017

(65) Prior Publication Data
US 2019/0170052 A1 Jun. 6, 2019

(51) Int. Cl.
| | |
|---|---|
| F01P 9/02 | (2006.01) |
| F02D 35/02 | (2006.01) |
| F02D 41/04 | (2006.01) |
| F02D 41/08 | (2006.01) |
| F01P 3/02 | (2006.01) |

(52) U.S. Cl.
CPC .............. *F01P 9/02* (2013.01); *F02D 35/025* (2013.01); *F02D 41/047* (2013.01); *F02D 41/086* (2013.01); *F01P 2003/021* (2013.01)

(58) Field of Classification Search
CPC ........ F02D 35/02; F02D 35/025; F02D 41/04; F02D 41/047; F02D 41/08; F02D 41/086; F01P 9/02
USPC ....................... 123/198 DB, 198 F, 294–305; 701/101–105, 111–115
See application file for complete search history.

(56) References Cited

U.S. PATENT DOCUMENTS

| | | | |
|---|---|---|---|
| 8,944,026 B2* | 2/2015 | Tobergte | F02D 13/06 |
| | | | 123/294 |
| 9,217,379 B2 | 12/2015 | Willard et al. | |
| 9,657,674 B2 | 5/2017 | Jammoussi et al. | |
| 2012/0285161 A1* | 11/2012 | Kerns | F02D 41/0087 |
| | | | 60/598 |
| 2015/0142296 A1* | 5/2015 | Tobergte | F02D 13/06 |
| | | | 701/103 |

OTHER PUBLICATIONS

Dudar, A., "Engine Cooling by Electrically Driven Intake Air Compressor," U.S. Appl. No. 15/786,325, filed Oct. 17, 2017, 63 pages.

* cited by examiner

*Primary Examiner* — John Kwon
*Assistant Examiner* — Johnny H Hoang
(74) *Attorney, Agent, or Firm* — Geoffrey Brumbaugh; McCoy Russell LLP

(57) ABSTRACT

Systems and methods are provided for cooling an overheated engine using a combination of variable displacement engine (VDE) technology and direct injection technology. In one example, a method may include deactivating a subset of engine cylinders based on an engine temperature and directly injecting liquid fuel into the deactivated cylinders. In this way, an increased thermal conductivity of the liquid fuel compared to air decreases the engine temperature at a faster rate than when air-based engine cooling methods are used, thereby preventing overheating-related engine degradation.

7 Claims, 7 Drawing Sheets

SYSTEMS AND METHODS FOR REDUCING ENGINE OVERHEATING USING LIQUID FUEL

FIELD

The present description relates generally to methods and systems for enhancing a rate of cooling of an overheated variable displacement engine.

BACKGROUND/SUMMARY

Vehicles may include a coolant system configured to reduce overheating of an engine by transferring the heat to ambient air. Therein, a coolant is circulated through the engine (e.g., through an engine block), where heat is transferred from the hot engine to the coolant, and then circulated through a radiator near the front of the vehicle, where heat is transferred from the coolant to the ambient air. Heated coolant may also be circulated through a heat exchanger to heat a passenger compartment. The coolant system may include various components, such as various valves, pumps, and one or more thermostats.

Various approaches have been developed to address engine overheating in the event of coolant system degradation. One example approach is shown by Willard et al. in U.S. Pat. No. 9,217,379. Therein, a method is disclosed for addressing engine overheating by alternately shutting down fuel to one or more cylinders while maintaining vehicle torque demand with the fueled cylinders. In still other examples, the engine may be cooled bank-wise, with fuel shut off to each cylinder of a first bank to cool the first bank while fuel is delivered to each cylinder of a second bank to continue to generate torque for vehicle propulsion.

However, the inventor herein has recognized potential issues with such systems. As one example, while heat may be transferred from the hot engine to the cool air flowing through the unfueled cylinders, air is a poor heat conductor. Additionally, high under-hood temperatures may be exacerbated on a hot day, which may raise the temperature of the air being pumped through the engine.

Further, the inventor herein has recognized that a combination of variable displacement engine (VDE) technology and direct injection technology may be utilized to cool the engine. Variable displacement engines are configured to operate with a variable number of active or deactivated cylinders to increase fuel economy. For example, a portion of the cylinders may be deactivated during selected conditions, such as during low engine torque demand. A control system may selectively deactivate cylinders via a plurality of cylinder valve deactivators, thereby sealing the deactivated cylinders by maintaining intake and exhaust valves of the deactivated cylinders closed. Typically, the deactivated cylinders are not fueled. However, the inventor herein has recognized that liquid fuel has a higher thermal conductivity than air, which may increase a rate of engine cooling compared with air. Additionally, a change in state of the liquid fuel as it vaporizes within the deactivated cylinders may further improve engine cooling.

In one example, the issues described above may be addressed by a method, comprising: deactivating a subset of cylinders of a multiple cylinder engine based on a temperature of the engine; and directly injecting fuel into each of the subset of cylinders during the deactivation. In this way, an overheated engine may be cooled with liquid fuel, increasing a rate of cooling compared to when the engine is cooled with air.

As one example, deactivating the subset of engine cylinders includes maintaining intake and exhaust valves coupled to each of the subset of engine cylinders closed. In this way, each of the subset of engine cylinders is sealed. By directly injecting fuel into the sealed cylinders, the fuel will remain in the sealed cylinders until the corresponding intake and exhaust valves are reactivated and opened. Furthermore, a spark plug coupled to each of the subset of engine cylinders may be disabled so that spark is not provided and combustion does not occur in each of the subset of engine cylinders. The liquid fuel may be injected into the sealed cylinders at a plurality of piston positions in order to coat various cylinder surfaces (e.g., top, bottom, and walls) and agitated within the sealed cylinders by the piston, absorbing heat from the hot cylinder surfaces. After the liquid fuel is vaporized (e.g., after a duration of agitation), the intake and exhaust valves of each of the subset of engine cylinders may be opened in order to exhaust the vaporized, uncombusted fuel. The process of deactivating the subset of engine cylinders and directly injecting fuel into each of the subset of engine cylinders during the deactivation may be repeated until the engine is sufficiently cooled (e.g., the engine temperature is less than a threshold temperature). Further still, cooling the engine with liquid fuel may be combined with air cooling methods, with the cooling method selected based on operating conditions, for greater flexibility. By utilizing VDE technology to deactivate and seal the subset of engine cylinders and injecting liquid fuel directly therein, the engine may be cooled at a faster rate than if airflow through the engine is used, preventing engine overheating-related degradation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
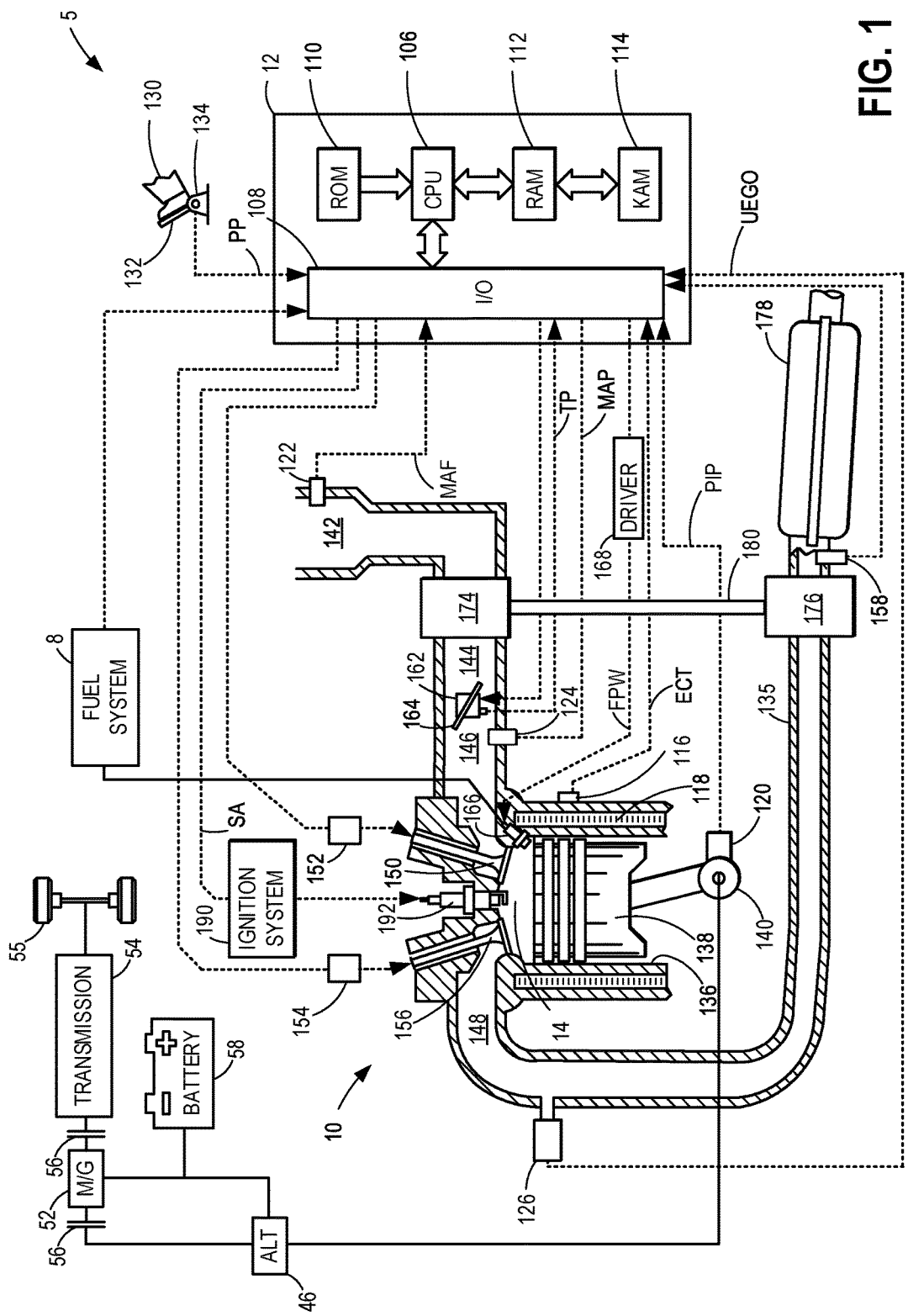
FIG. 1 shows a schematic depiction of an example vehicle system.
Figure 2:
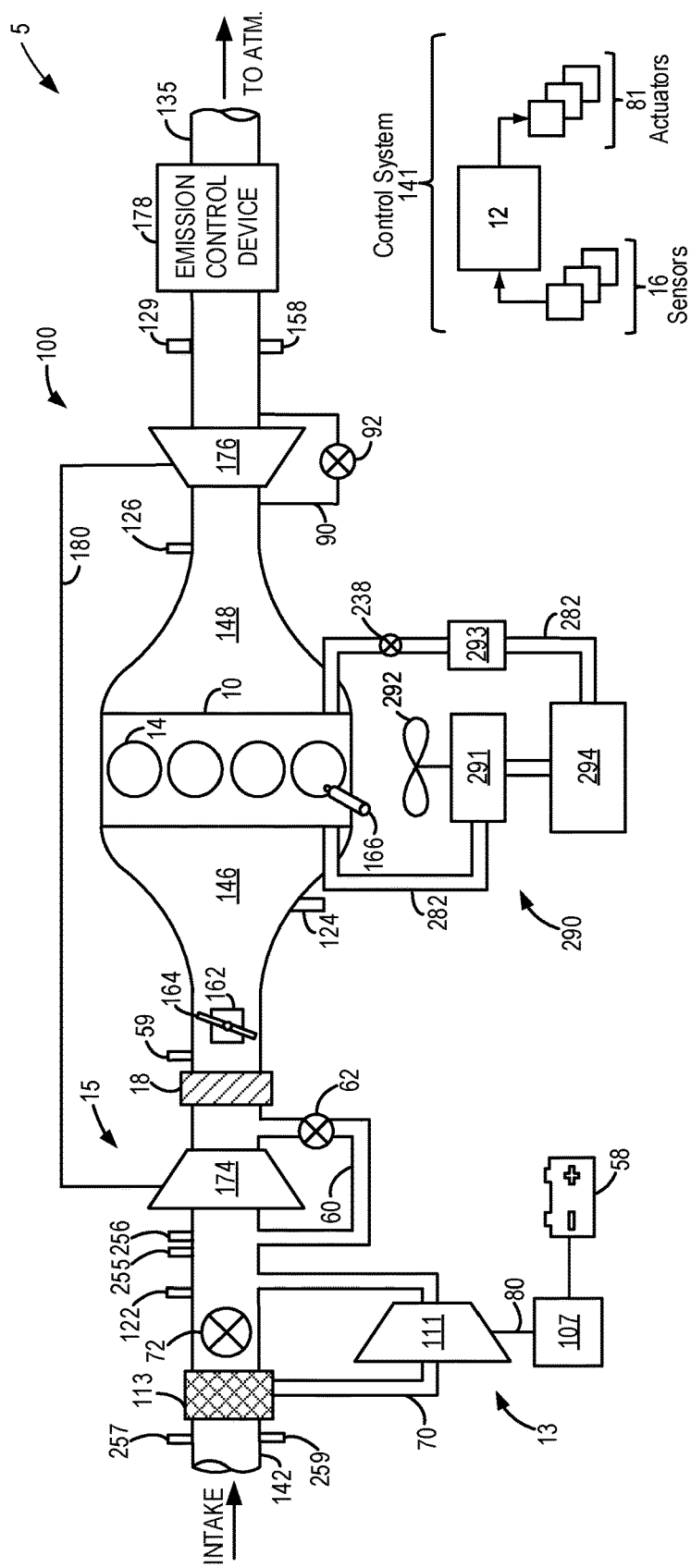
FIG. 2 shows an example of a compound boosted engine system having multiple staged intake compression devices and an engine cooling system.

The following description relates to systems and methods for cooling an overheated engine in a vehicle system, such as the vehicle shown in FIGS. 1 and 2. Specifically, an engine controller may be configured to perform a control routine, such as the example routine of FIG. 3, to select between cooling the engine using intake airflow while operating in non-VDE mode and using liquid fuel while operating in VDE mode based on operating conditions and cooling demand, for example. While the engine is off, such as while the vehicle is off or during an idle-stop, the engine may be cooled using intake airflow by spinning the engine electrically and providing airflow via an electric boosting device, such as according to the example method of FIG. 4. While the engine is on, the engine may be cooled with intake airflow while fueling to one or more cylinders is distributively disabled according to the example method of FIG. 5. If the intake airflow is unable to sufficiently cool the engine, such as when the engine temperature continues to increase (e.g., at a rate that is higher than a threshold rate) or when the engine is severely overheated (e.g., the engine temperature is greater than a higher threshold), the engine may be cooled using liquid fuel while operating in VDE mode, such as according to the example method of FIG. 6. An example overheated engine cooling operation is shown with reference to FIG. 7.

Turning now to the figures, FIG. 1 depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of the vehicle via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbo charger or a supercharger. For example, FIG. 1 shows engine 10 configured with a turbo charger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbo charger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. As will be described with reference to FIG. 2, engine 10 may be configured with a dual stage, compound boosting system that includes the turbo charger and an electric supercharger to overcome lag time while the turbo charger spins up in response to an operator demand for torque. The electric supercharger also may be operated to cool an overheated engine, as further described herein.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

In one example, intake valve 150 and exhaust valve 156 may be deactivated during VDE mode via hydraulically actuated lifters coupled to valve pushrods or via a CPS mechanism in which a cam lobe with no lift is used for deactivated valves. Still other valve deactivation mechanisms may also be used, such as for electrically actuated valves. In one embodiment, deactivation of intake valve 150 may be controlled by a first VDE actuator while deactivation of exhaust valve 156 may be controlled by a second VDE actuator. In alternate embodiments, a single VDE actuator may control deactivation of both intake and exhaust valves of the cylinder. In still other embodiments, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection. Further still, liquid fuel may be injected into deactivated cylinders while operating in VDE mode at multiple piston positions in order to cool the cylinder, as will be described with respect to FIG. 6.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; throttle position (TP) from a throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may transition the engine to operating in VDE mode by actuating valve actuators 152 and 154 to deactivate selected cylinders and inject liquid fuel into the selected cylinders (e.g., via fuel injector 166) based on signal ECT measured by engine coolant temperature sensor 116, as will be further described with respect to FIG. 6.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and deactivating respective intake and exhaust valves 150 and 156. While fuel injectors of the disabled cylinders are turned off, the remaining enabled cylinders continue to carry out combustion, with corresponding fuel injectors and intake and exhaust valves active and operating. To meet torque requirements, the engine produces the same amount of torque in the remaining active cylinders that was produced will all of the cylinders carrying out combustion. This requires higher manifold pressures, resulting in lowered pumping losses and increased engine efficiency. Additionally, the lower effective surface area (from only the active cylinders) exposed to combustion reduces engine heat losses, improving the thermal efficiency of the engine.

Next, FIG. 2 schematically shows aspects of an example engine system 100, including engine 10, that may be coupled in vehicle 5. Components described with reference to FIG. 2 that have the same identification labels as components described with reference to FIG. 1 are the same components and may operate as previously described. Further, some components may not be reintroduced. Further still, some or all of the components depicted in FIGS. 1 and 2 may be included in vehicle 5.

In the depicted example, engine 10 is a compound boosted engine configured with multiple, staged boosting devices. Specifically, engine 10 includes an electric supercharger 13 staged upstream of a turbo charger 15, although other configurations may be possible without departing from the scope of this disclosure (such as turbo charger 15 staged upstream of electric supercharger 13). The depicted configuration results in a first compressor 111 (of electric supercharger 13) being positioned in intake passage 142 upstream of a second compressor 174 (of turbo charger 15). As shown, electric supercharger 13 includes an electric motor 107. In alternate examples, turbo charger 15 may be an electric turbo charger having an electric motor coupled to compressor 174, turbine 176, or shaft 180 while supercharger 13 is configured as an electric or mechanical supercharger. In other examples, both the first and second boosting device may be electric superchargers or electric turbochargers. In still other examples, only a single boosting device, such as an electric supercharger or an electric turbo charger, may be included in engine system 100.

In the depicted example, first compressor 111 is driven by electric motor 107. Specifically, a fan of first compressor 111 may be driven by electrical power received from electric motor 107 along a supercharger compressor shaft 80. In some examples, first compressor 111 of supercharger 13 may additionally be driven by the engine crankshaft via a clutch and gear mechanism. Electric motor 107 may be powered by an on-board energy storage device, such as system battery 58. Electric motor 107 may be additionally or alternatively powered by alternator 46 (shown in FIG. 1). An amount of electrical power delivered to electric motor 107 may be varied in order to adjust a duty cycle of electric supercharger 13. In one example, the amount of electrical power delivered to electric motor 107 may be increased to increase a speed of first compressor 111, with a corresponding increase in the electrical load applied on the alternator and a decrease in alternator current. As a result, electric supercharger 13 may be rapidly spun up, providing for a fast-acting or high frequency boost actuation.

Turbo charger 15 includes second compressor 174, which is driven by turbine 176 via shaft 180. Turbine 176 is driven by expanding engine exhaust. In one example, turbo charger 15 may be a twin scroll device. In another example, turbo charger 15 may be a variable geometry turbo charger (VGT), wherein turbine geometry is actively varied as a function of engine operating conditions.

During selected conditions, air may enter first compressor 111 when an opening of an electric supercharger bypass valve (ESBV) 72 is decreased, thereby directing incoming air from an air filter 113 through a first compressor bypass passage 70 and through first compressor 111, where it is pressurized for delivery to second compressor 174. Fresh air received at an inlet of second compressor 174 is then compressed and introduced into engine 10. As the opening of ESBV 72 increases, an amount of air entering second compressor 174 without having passed through first compressor bypass passage 70 and first compressor 111 increases. During conditions when ESBV 72 is fully opened, pressurized air may be delivered to engine 10 via second compressor 174 of turbo charger 15 without passing through first compressor 111 of electric supercharger 13.

During selected conditions, air compressed by turbo charger 15 may be recirculated from an outlet to an inlet of second compressor 174 through a second compressor bypass passage 60 by adjusting an opening of a compressor recirculation valve (CRV) 62. CRV 62 may be a continuously variable valve, and increasing the opening of the CRV 62 may include actuating (or energizing) a solenoid of the valve. One or both of CRV 62 and ESBV 72 may be continuously variable valves wherein a position of the valve is continuously variable from a fully closed position to a fully open position. Alternatively, CRV 62 may be a continuously variable valve while ESBV 72 is an on-off valve. In some embodiments, CRV 62 may be partially open during boosted engine operation to provide a surge margin. Herein, the partially open position may be a default valve position. Then, in response to an indication of surge, the opening of CRV 62 may be increased. For example, CRV 62 may be adjusted from the default, partially open position toward a fully open position, with a degree of opening based on the indication of surge (e.g., the compressor ratio, the compressor flow rate, a pressure differential across the compressor, etc.). In alternate examples, CRV 62 may be held closed during boosted engine operation (e.g., peak performance conditions) to decrease boost response time and increase peak performance.

As shown in FIG. 2, air flows from second compressor 174 through a charge air cooler (CAC) 18 and throttle 162 to intake manifold 146. CAC 18 may be an air-to-air or water-to-air heat exchanger, for example. Intake manifold pressure (e.g., a pressure of the air charge within the intake manifold) may be determined using MAP sensor 124.

Intake manifold 146 is coupled to a plurality of cylinders 14 of engine 10 through a series of intake valves (e.g., intake valve 150 as shown in FIG. 1). Cylinders 14 are further coupled to exhaust manifold 148 via a series of exhaust valves (e.g., exhaust valve 156 as shown in FIG. 1). In the depicted embodiment, a single exhaust manifold 148 is shown. However, in other embodiments, the exhaust manifold may include a plurality of exhaust manifold sections. Configurations having a plurality of exhaust manifold sections may enable effluent from different combustion chambers to be directed to different locations in the engine system.

As shown in FIG. 2, exhaust from exhaust manifold 148 is directed to turbine 176 to drive the turbine. When reduced turbine torque is desired, a portion of the exhaust may be directed instead through a wastegate 90, bypassing the turbine. A wastegate actuator 92 (e.g., wastegate valve) may be actuated open to relieve at least some exhaust pressure from upstream of turbine 176 to a location downstream of turbine 176 via wastegate 90. By reducing exhaust pressure upstream of turbine 176, turbine speed may be reduced.

The combined flow from turbine 176 and wastegate 90 flows through emission control device 178. All or part of the treated exhaust from emission control device 178 may be released into the atmosphere via exhaust passage 135. Depending on operating conditions, however, some exhaust may be diverted instead to intake passage 142 via an exhaust gas recirculation (EGR) passage (not shown), including an EGR cooler and an EGR valve. EGR may be recirculated to the inlet of first compressor 111, the inlet of second compressor 174, or both.

One or more sensors may be coupled to the inlet of second compressor 174 (as shown) and/or first compressor 111 (not shown). For example, a temperature sensor 255 may be coupled to the inlet of second compressor 174 for estimating a compressor inlet temperature. As another example, a pressure sensor 256 may be coupled to the inlet of second compressor 174 for estimating a pressure of air entering the second compressor. Still other sensors may include, for example, air-fuel ratio sensors, humidity sensors, etc. In other examples, one or more of the second compressor inlet conditions (such as humidity, temperature, etc.) may be inferred based on engine operating conditions. The sensors may estimate a condition of the intake air received at the second compressor inlet from the intake passage as well as the aircharge recirculated from upstream of CAC 18. One or more sensors may also be coupled to intake passage 142 upstream of first compressor 111 for determining a composition and condition of aircharge entering the first compressor. These sensors may include, for example, a humidity sensor 257 and a pressure sensor 259. Humidity sensor 257 may be any type of humidity sensor, such as a relative humidity sensor or an absolute humidity sensor, and may provide an indication of ambient humidity. Pressure sensor 259 may provide an indication of ambient (e.g., barometric) pressure. In addition, a throttle inlet pressure (TIP) sensor 59 may be coupled downstream of CAC 18 and upstream of throttle 162 for estimating a boost pressure delivered to the engine.

Engine 10 may have an associated cooling system 290 for maintaining a temperature of engine 10 within a desired range. Cooling system 290 may be operated to reduce the temperature of engine 10 by actuating a coolant pump 293 to flow liquid coolant, drawn from a coolant sump or reservoir 294, around engine 10 as well as through channels within engine 10 via coolant lines 282. In some examples, coolant pump 293 may be an engine-driven water pump coupled to the engine via a front end accessory drive and rotated proportionally to engine speed via a belt, chain, etc.

Coolant temperature may be regulated by a thermostat valve 238, located in coolant line 282, which may be kept closed until the coolant reaches a threshold temperature.

After passing through the engine and absorbing engine heat, the heated coolant passes through narrow channels within a radiator 291 where it may transfer the heat to ambient air before returning to coolant reservoir 294. A cooling fan 292 may be coupled to radiator 291 for blowing ambient air past radiator 291, thereby increasing a rate of heat transfer between the heated coolant and the air, especially when vehicle 5 is stationary. In further examples, the heated coolant may be circulated through a heater core (not shown) where the heat may be rejected to components requiring heating (such as for cabin heating). Cooling system 290 operation, including pump output and cooling fan speed, may be controlled by controller 12 based on the output of one or more temperature sensors, such as engine coolant temperature sensor 116 shown in FIG. 1.

Controller 12 may be included in a control system 141. Controller 12 is shown receiving information from a plurality of sensors 16 (various examples of which are described herein) and sending control signals to a plurality of actuators 81 (various examples of which are described herein). As one example, sensors 16 may include exhaust gas sensor 126, MAP sensor 124, exhaust temperature sensor 158, an exhaust pressure sensor 129 coupled to exhaust passage 135, compressor inlet temperature sensor 255, compressor inlet pressure sensor 256, MAF sensor 122, pressure sensor 259, TIP sensor 59, and engine coolant temperature sensor 116 (shown in FIG. 1). Other sensors, such as additional pressure, temperature, air/fuel ratio, humidity, and composition sensors, may be coupled to various locations in engine system 100. The actuators 81 may include, for example, throttle 162, CRV 62, ESBV 72, electric motor 107, wastegate actuator 92, fuel injector 166, coolant pump 293, cooling fan 292, intake valve actuator 152 (shown in FIG. 1), and exhaust valve actuator 154 (shown in FIG. 1). Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as the example routines described herein with regard to FIGS. 3-6. For example, controller 12 may make a determination of an engine overheating condition based on signal ECT received from engine coolant temperature sensor 116 and, in response thereto, select a cooling method based on operating conditions (as described with respect to FIG. 3) and send different signals to the actuators based on the selected method. As one example, based on an "on" state of engine 10 and the signal ECT, controller 12 may determine to cool the engine using liquid fuel while operating in VDE mode and, in response thereto, deactivate cylinder 14 (via intake valve actuator 152 and exhaust valve actuator 154) and actuate fuel injector 166 to inject liquid fuel into the deactivated cylinder 14, as will be further described with respect to FIG. 6.

As an engine is operated, heat is produced. As described above, a cooling system (e.g., cooling system 290 of FIG. 2) is provided to maintain a temperature of the engine within a nominal operating temperature range, thereby preventing engine degradation due to overheating. However, degradation or improper maintenance of cooling system components may result in the engine overheating (e.g., operating above its nominal operating temperature range). As non-limiting examples, insufficient cooling even after operating the coolant system (such as by actuating a cooling fan and a coolant pump) may occur due to loss of coolant from the cooling system (e.g., due to cooling system degradation or due to a coolant reservoir not being refilled), degradation of the cooling fan (e.g., cooling fan 292 of FIG. 2), degradation of the coolant pump (e.g., coolant pump 293 of FIG. 2), and/or the presence of blockages in coolant jackets/passages inside a cylinder head. Therefore, when the engine becomes overheated despite operating the cooling system, a controller may employ additional cooling strategies to lower the engine temperature and prevent engine degradation until the cooling system can be serviced.

Figure 3:
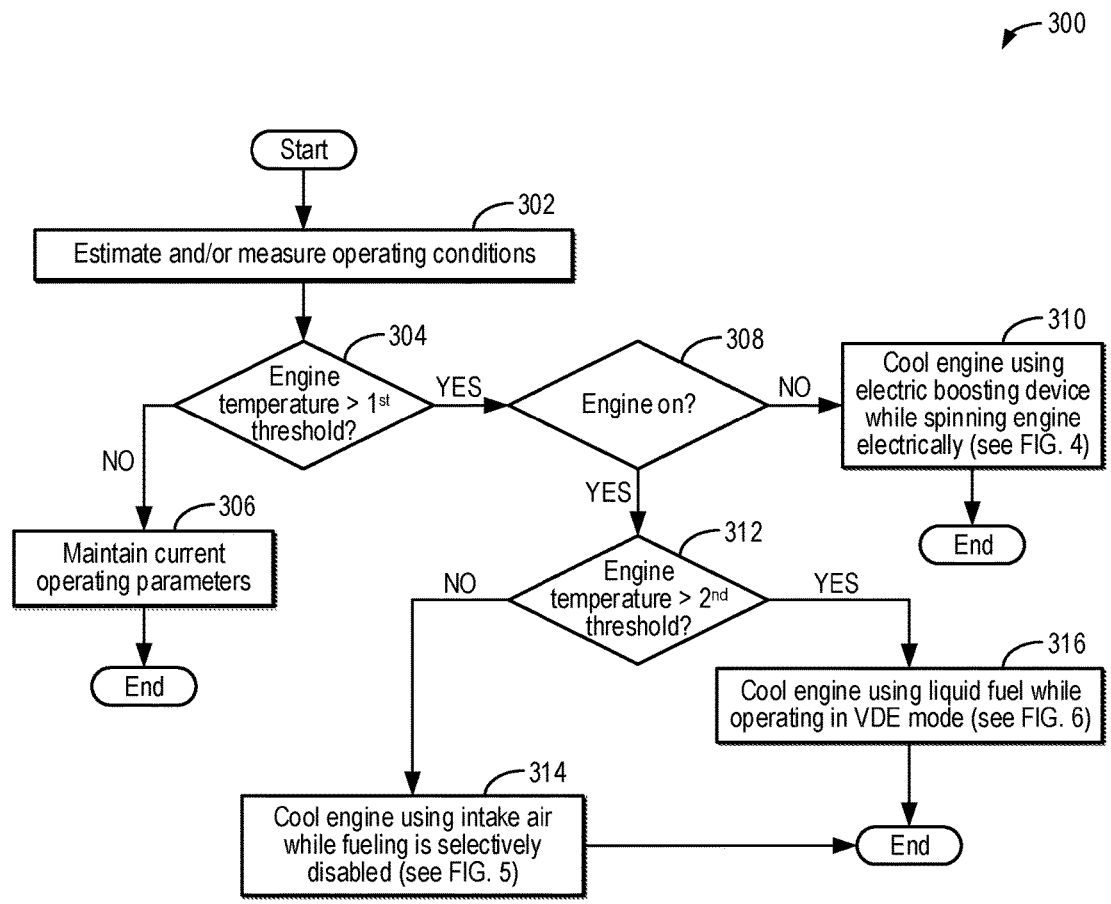
FIG. 3 shows a high-level flowchart of an example method for cooling an overheated engine via intake airflow or liquid fuel injection based on operating conditions.

FIG. 3 shows an example method 300 for cooling an overheated boosted VDE engine, such as engine 10 of FIGS. 1 and 2. As described above, the engine may overheat due to degradation of an engine cooling system included in a vehicle. Thus, systems may be employed to facilitate engine cooling. For example, an electric boosting device (e.g., supercharger 13 of FIG. 2) may be provided for reducing "turbo lag" while a turbine of a turbo charger spins up. The electric boosting device may also be leveraged to increase cool airflow through the engine, thereby increasing a rate of cooling. Further, VDE mode may be leveraged to seal deactivated cylinders and trap liquid fuel inside them for increased cooling due to the higher heat conductivity of liquid fuel over air. However, as injecting liquid fuel into deactivated cylinders increases fuel consumption, the VDE mode cooling may be performed when air-cooling is insufficient. Method 300 and the rest of the methods included herein will be described with reference to the systems described and shown in FIGS. 1 and 2, although it should be understood that similar methods may be applied to other systems without departing from the scope of this disclosure. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system (e.g., fuel injector 166 of FIGS. 1 and 2) to adjust engine operation according to the methods described below.

Method 300 begins at 302 and includes estimating and/or measuring operating conditions. Operating conditions may include, but are not limited to, a state of the vehicle (e.g., on or off), a state of the engine (e.g., on or off), an operating mode of the engine (e.g., VDE mode or non-VDE mode), engine speed, engine load, manifold pressure, engine temperature, driver-demanded torque, and a temperature of a catalyst (e.g., emission control device 178 of FIGS. 1 and 2). For example, the engine speed may be determined from a signal PIP output by an engine speed sensor (e.g., Hall effect sensor 120 of FIG. 1), the engine load may be determined from a signal MAF output by a MAF sensor (e.g., MAF sensor 122 of FIGS. 1 and 2), the manifold pressure may be determined from a signal MAP output by a MAP sensor (e.g., MAP sensor 124 of FIGS. 1 and 2), and the driver-demanded torque may be determined from a signal PP output by a pedal position sensor (e.g., pedal position sensor 134 of FIG. 1). As one example, the engine temperature may be directly determined based on an output of an engine coolant temperature sensor (e.g., signal ECT from engine coolant temperature sensor 116 shown in FIG. 1). As another example, the engine temperature may be directly determined based on an output of a cylinder head temperature sensor. As still another example, the engine temperature may be directly determined based on an output of a temperature sensor coupled to an exhaust manifold of the engine (e.g., exhaust manifold 148 of FIGS. 1 and 2). In addition to determining the engine temperature, the controller may also determine an actual rate and/or a predicted (e.g., anticipated) rate at which the engine temperature is increasing based on the operating conditions (e.g., engine speed, engine load, boost pressure, and torque demand).

At 304, it is determined if the engine temperature is greater than a first threshold temperature. The first threshold temperature is a non-zero, positive temperature value that defines the maximum temperature of the engine's nominal operating temperature range. Therefore, engine temperatures above the first threshold temperature indicate an engine overheating condition, meaning that the engine is unable to be sufficiently cooled by the engine cooling system (such as due to cooling system degradation). For example, the first threshold temperature may be in a range of 220-250° F.

If the engine temperature is not greater than the first threshold temperature, method 300 proceeds to 306 and includes maintaining current operating parameters. For example, with the engine temperature less than the first threshold temperature, it may be assumed that the engine cooling system is functioning nominally, such as without degradation to one or more cooling system components, and is keeping the engine sufficiently cooled and within its normal operating range. As another example, the engine may be off and not producing heat from combustion. Thus, maintaining current operating parameters may include not actuating the electric boosting device, not selectively disabling cylinder fueling, and not injecting liquid fuel into sealed, deactivated cylinders while operating in VDE mode for the purpose of engine cooling. Following 306, method 300 ends.

If the engine temperature is greater than the first threshold temperature, method 300 proceeds to 308 and includes determining if the engine is on. "On" refers to a state where the engine is operating at a non-zero speed and combusting a mixture of air and fuel within engine cylinders. "Off" refers to a state where the engine is at rest and combustion does not occur in the engine cylinders. The engine state may be independent of a vehicle state, such as when the engine is included in a HEV or a stop/start vehicle. For example, an electric mode of vehicle operation may be selected in the HEV when the torque demand is lower (e.g., lower than a torque threshold), when the fuel level in the fuel tank is lower (e.g., lower than a fuel level threshold), and/or when the battery state of charge (SOC) is higher (e.g., higher than a threshold SOC). In the electric mode, the vehicle is propelled via torque from an electric motor (e.g., electric machine 52 of FIG. 1) powered by an energy storage device (e.g., system battery 58 of FIG. 1) and not from engine torque. Thus, while operating in the electric mode, the vehicle is on (e.g., powered on, with an ignition switch in an "on" position), but the engine may be off. As another example, an engine mode of operation may be selected in the HEV when the torque demand is higher, when the fuel level in the fuel tank is higher, and/or when the battery state of charge is lower. In the engine mode, the vehicle is propelled via torque from the engine and not via torque from the electric motor, and thus, the engine is on and operating. As a further example, an assist mode may be selected in which the HEV is propelled via a combination of the electric motor torque and the engine torque if the torque demand is higher than can be provided via the engine torque alone, and thus, the engine is on and operating in the assist mode. As another example, when the engine is included in a stop/start vehicle, the engine may be shut down while the vehicle remains on during an idle-stop, such as when the vehicle speed is less than a threshold speed, the battery SOC is greater than a threshold SOC, etc. In other examples, the engine is off while the vehicle is off (e.g., powered off, with the ignition switch in an "off" position).

If the engine is not on (e.g., the engine is off), method 300 proceeds to 310 and includes cooling the engine using the electric boosting device while spinning the engine electrically, as will be described with respect to FIG. 4. In this way, cool intake air may be flowed through the engine, transferring heat from the engine to the air to increase a rate of cooling. Following 310, method 300 ends.

If the engine is on, method 300 proceeds to 312 and includes determining if the engine temperature is greater than a second threshold temperature. The second threshold temperature is a non-zero, positive temperature that is higher than the first threshold temperature and refers to a temperature above which the engine may be considered severely overheated. When the engine is severely overheated, engine degradation may occur. For example, the second threshold temperature may be in a range of 250-280° F. Additionally or alternatively at 312, method 300 may include determining if a rate of temperature increase is greater than a threshold rate. The threshold rate is a non-zero, positive rate that indicates the current cooling strategy is unable to keep the engine temperature from further increasing.

If the engine temperature is not greater than the second threshold temperature (e.g., the engine temperature is greater than the first threshold temperature and less than or equal to the second threshold temperature, or if the rate of temperature increase is not greater than the threshold rate), method 300 proceeds to 314 and includes cooling the engine using intake air while fueling is selectively disabled, as will be described with respect to FIG. 5. By selectively disabling fueling in one or more engine cylinders, intake air may flow through the one or more engine cylinders, cooling them. Following 314, method 300 ends.

Returning to 312, if the engine temperature is greater than the second threshold temperature (or the rate of temperature increase is greater than the threshold rate), method 300 proceeds to 316 and includes cooling the engine using liquid fuel while operating in VDE mode, as will be described with respect to FIG. 6. For example, the engine may be transitioned to the VDE mode by deactivating selected cylinders. The deactivated cylinders are sealed, with corresponding cylinder intake and exhaust valves fully closed. Liquid fuel is injected into the sealed, deactivated cylinders due to the higher thermal conductivity of liquid fuel versus air for faster cooling. For example, the thermal conductivity of gasoline is over six times higher than air. Furthermore, as the liquid fuel evaporates, the phase change from liquid to vapor elicits a secondary cooling effect. In this way, the engine is cooled using liquid fuel while operating in the VDE mode when other cooling methods are unable to decrease or maintain the engine temperature. Following 316, method 300 ends.

Figure 4:
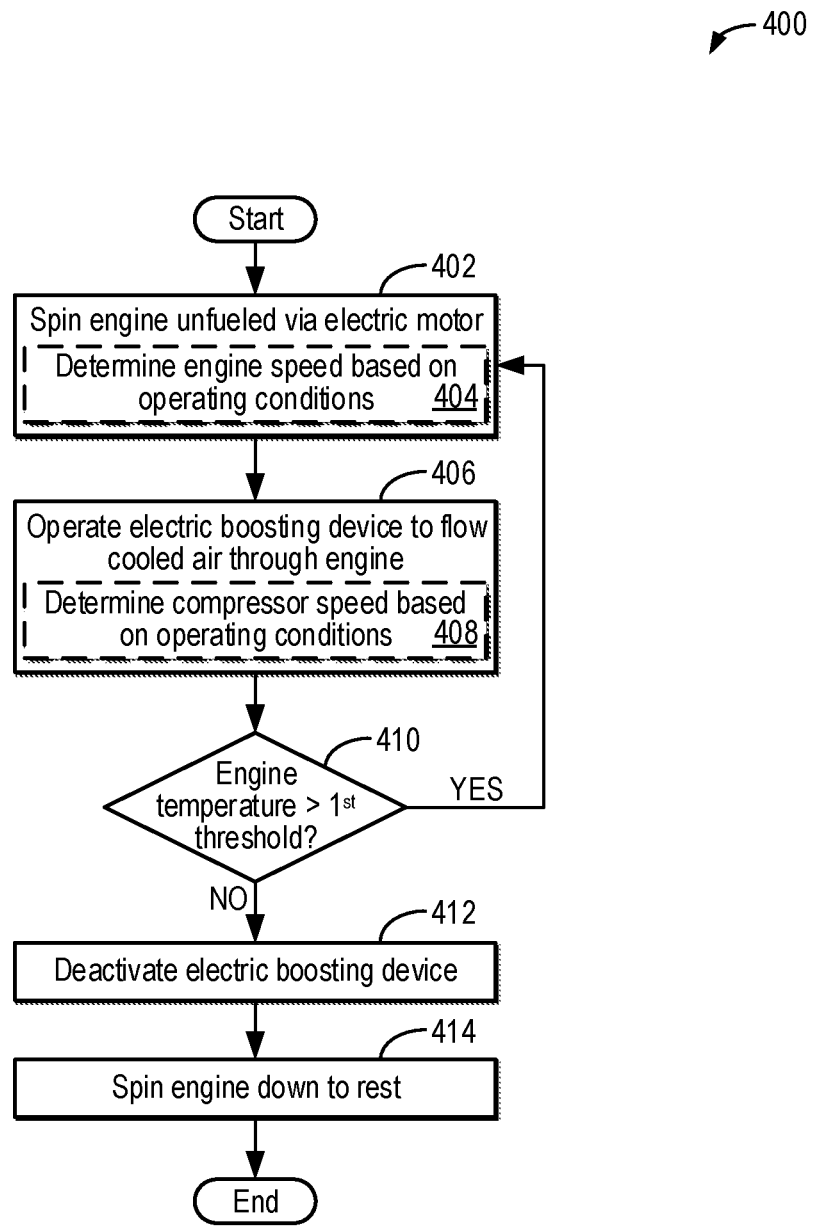
FIG. 4 shows an example method for cooling an overheated engine while the engine is off by spinning the engine electrically and providing airflow via an electric boosting device.

Next, FIG. 4 shows an example method 400 for cooling an overheated engine in a vehicle while the engine is off using an electric boosting device (e.g., supercharger 13 of FIG. 2) and spinning the engine electrically. As described above with respect to FIG. 3, the engine may be off (e.g., unfueled, without combustion occurring in engine cylinders) while the vehicle is off (e.g., an ignition switch of the vehicle is in an "off" position), while the vehicle is on during an idle-stop, and while the vehicle is operating in an electric mode. A controller (e.g., controller 12 of FIGS. 1 and 2) may operate the electric boosting device to provide on-demand airflow in response to an indication of engine overheating, as described with respect to FIG. 3. Further, the engine may be spun unfueled by an electric motor in order to pump the cooled airflow through the overheated engine. Method 400 may be performed as a part of method 300 of FIG. 3 (e.g., at 310). Alternatively, method 400 may be performed responsive to any indication of engine overheating while the engine is off.

Method 400 begins at 402 and includes spinning the engine unfueled via the electric motor. For example, the engine may be continuously rotated using a starter motor (if the engine is included in a conventional vehicle where the engine is the only source of torque) or an electric machine (if the engine is included in a hybrid vehicle, such as electric machine 52 of FIG. 1). In some examples, the controller may determine the engine speed based on operating conditions, as indicated at 404, such as measured at 302 of FIG. 3. The operating conditions may include, but are not limited to, engine temperature, ambient temperature, and ambient humidity. For example, the controller may input the operating conditions (e.g., one or more of the engine temperature, the ambient temperature, and the ambient humidity) into a look-up table, map, or algorithm and output a corresponding engine speed for cooling the overheated engine under the given operating conditions, then determine a motor speed of the starter motor or electric machine that will provide the determined engine speed, such as via a look-up table, map, or algorithm. In another example, the engine speed is independent of the operating conditions. The controller may adjust a duty cycle of non-zero voltage supplied to the starter motor or the electric machine to operate the starter motor or the electric machine at the determined motor speed that will provide the determined engine speed, for example.

At 406, method 400 includes operating the electric boosting device to flow cooled air through the engine. As described with respect to FIG. 2, the electric boosting device may be an electric supercharger, although any electrically assisted boosting device may be used, such as an electrically assisted turbo charger. The electric boosting device may include a compressor (e.g., first compressor 111 of FIG. 2) and an electric motor (e.g., electric motor 107 of FIG. 2), the electric motor driving the compressor via a compressor shaft (e.g., supercharger compressor shaft 80). As an example, activating the electric boosting device may include determining a compressor speed that will provide a desired amount of engine cooling and then determining a motor speed that will provide the determined compressor speed. In some examples, the compressor speed may be determined based on operating conditions, such as one or more of the engine temperature, the ambient temperature, and the ambient humidity, as indicated at 408. For example, the controller may input the operating conditions (e.g., the engine temperature, the ambient temperature, and the ambient humidity) into a look-up table, map, or algorithm and output the desired amount of engine cooling under the given operating conditions, then determine the compressor speed that will provide the desired amount of engine cooling, such as via a look-up table, map, or algorithm. Additionally or alternatively, the desired amount of engine cooling and/or the compressor speed may be determined based on one or more of a difference between the current engine temperature and a first threshold temperature (as defined at 304 of FIG. 3) and a rate of engine temperature increase. For example, as the difference and/or the rate increases, the determined compressor speed may increase. In one example, the controller may use a look-up table, map, or algorithm that uses the current engine temperature and a target engine temperature as inputs and outputs a corresponding compressor speed to reduce the current engine temperature to the target engine temperature. In another example, the compressor speed is a predetermined value and independent of the operating conditions. The controller may adjust a duty cycle of non-zero voltage supplied to the electric motor of the electric boosting device to operate the electric motor at the determined motor speed that will provide the determined compressor speed. For example, voltage may be supplied by a system battery of the vehicle (e.g., system battery 58 of FIGS. 1 and 2). In some examples, activating the electric boosting device may further include fully closing a bypass valve (e.g., ESBV 72 of FIG. 2) so that all of the intake air is directed through the compressor of the electric boosting device, such as via a bypass passage (e.g., first compressor bypass passage 70 of FIG. 2). Further, as mentioned above, the intake air may pass through a CAC (e.g., CAC 18 of FIG. 2), where the air is cooled before being delivered to engine cylinders.

At 410, method 400 includes determining if the engine temperature is greater than the first threshold temperature, as defined above. If the engine temperature is greater than the first threshold temperature, the engine is still overheated and has not yet been sufficiently cooled (e.g., the desired amount of engine cooling has not been achieved). Therefore, method 400 returns to 402 to continue spinning the engine unfueled via the electric motor. In some examples, the engine speed may be continue to be adjusted (e.g., at 404) and the compressor speed may continue to be adjusted (e.g., at 408) as operating conditions, such as the engine temperature, change. For example, as the engine temperature decreases (e.g., the difference between the current engine temperature and the first threshold temperature decreases), one or more of the engine speed and the compressor speed may be decreased.

If the engine temperature is not greater than the first threshold temperature (e.g., the engine temperature is less than or equal to the first threshold temperature), then the engine may be considered sufficiently cooled and no longer overheated (e.g., the desired amount of engine cooling has been achieved), and method 400 proceeds to 412. At 412, method 400 includes deactivating the electric boosting device. Deactivating the electric boosting device may include stopping the supply of electrical power to the electric motor of the electric boosting device, for example. In some examples, deactivating the electric boosting device may also include at least partially opening the bypass valve so that intake air may bypass the electric boosting device and flow to the engine intake without flowing through the compressor of the electric boosting device.

At 414, method 400 includes spinning the engine down to rest. For example, the starter motor or electric machine may be deactivated, such as by stopping the supply of voltage to the starter motor or the electric machine, so that the motor speed and the engine speed decrease to zero. As another example, when the electric machine is being used to spin the engine electrically, spinning the engine down to rest may include decoupling the engine from the electric machine, such as by disengaging a clutch connecting the electric machine to a crankshaft of the engine (e.g., first clutch 56 of FIG. 1), so that the electric machine no longer rotates the crankshaft. Following 414, method 400 ends. In this manner, the electric boosting device may be used to actively cool the engine while the engine is off, wherein the extent of active engine cooling may be based on an extent of engine overheating, as indicated by the engine temperature or the rate of engine temperature increase.

Figure 5:
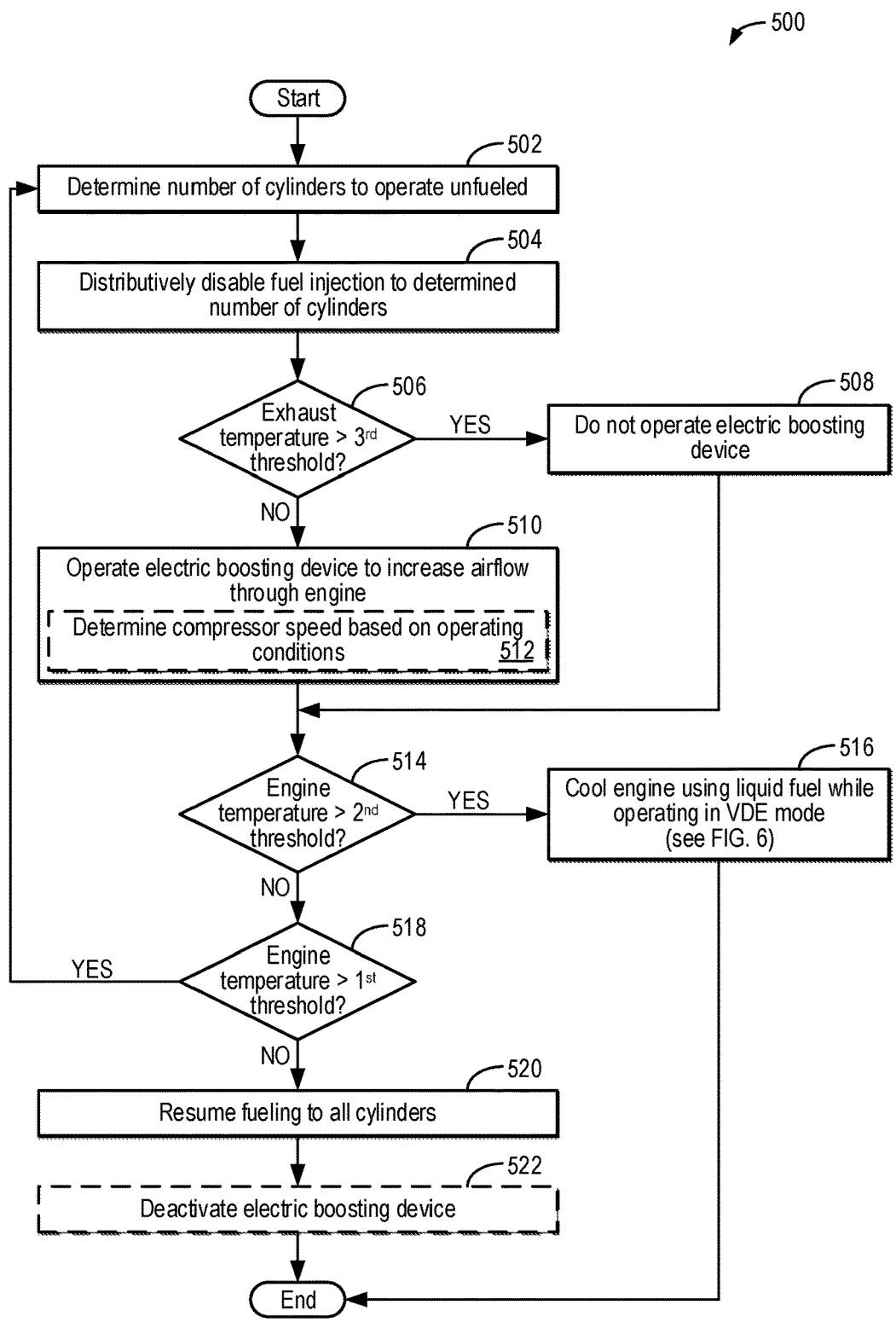
FIG. 5 shows an example method for cooling an overheated engine using intake airflow while cylinder fueling is selectively disabled.

Next, FIG. 5 shows an example method 500 for cooling an overheated engine while the engine is on (e.g., fueled, with combustion occurring in engine cylinders) using intake air while fueling is selectively disabled. For example, a controller (e.g., controller 12 of FIGS. 1 and 2) may cut fuel to one or more of the engine cylinders in a distributive fashion, pumping intake air through the unfueled cylinders to cool them. Additionally, in some examples, additional airflow may be provided by an electric boosting device (e.g., supercharger 13 of FIG. 2). Method 500 may be performed as a part of method 300 of FIG. 3 (e.g., at 314) and/or as a part of method 600 of FIG. 6 (e.g., at 636). Alternatively, method 500 may be performed responsive to any indication of engine overheating while the engine is on.

Method 500 begins at 502 and includes determining a number of cylinders to operate unfueled. The number of cylinders may be determined based on operating conditions, such as measured at 302 of FIG. 3. For example, a greater number of cylinders may be operated unfueled as the engine speed increases and/or as the engine temperature increases. Conversely, a smaller number of cylinders may be operated unfueled as the engine speed decreases and/or the engine temperature decreases. As another example, a greater number of cylinders may be operated unfueled when a rate of engine temperature increase is larger (e.g., greater than a threshold rate), and a smaller number of cylinders may be operated unfueled when the rate of engine temperature increase is smaller. The number of cylinders may be further based on torque demand in order to maintain vehicle operability and driveability, as the remaining fueled cylinders provide all of the engine torque. Further, the number of unfueled cylinders may be restricted in order to mitigate engine noise, vibration, and harshness (NVH) depending on a configuration of the engine (e.g., a layout and a total number of cylinder). The engine may determine the number of cylinders to operate unfueled by inputting the operating conditions, such as one or more of the engine speed, the engine temperature (or rate of temperature increase), and the engine torque demand into one or more look-up tables, maps, or algorithms and output the number of cylinders to operate unfueled for the given conditions.

At 504, method 500 includes distributively disabling fuel injection to the determined number of cylinders. As one example, the fuel injection to the determined number of cylinders may be disabled in a round robin fashion wherein the disabling is cycled or distributed uniformly amongst the engine cylinders. Using a four-cylinder engine as an example, when the determined number of cylinders is two, the fuel injection to a first set of two cylinders may be disabled during a first engine cycle (or number of engine cycles), and the fuel injection to a second set of two cylinders may be disabled during a second engine cycle (or number of engine cycles). Then, the fuel injection to the first set of two cylinders may again be disabled during a third engine cycle (or number of engine cycles), etc. The particular cylinders included in each set may be selected in order to mitigate engine NVH, for example, such as based on the configuration of the engine. As another example, the disabling may be cycled or distributed uniformly amongst engine cylinders that are not deactivatable while operating in VDE mode due to hardware restrictions, thus increasing cooling to the engine cylinders that cannot be cooled using liquid fuel (as will be described with respect to FIG. 6). With fueling disabled, spark may also be disabled in the corresponding cylinders, as combustion does not occur in the unfueled cylinders. Furthermore, while fuel injection to the determined number of cylinders is disabled, engine operating parameters may be adjusted in order to maintain the engine torque demand with the remaining combusting cylinders. As will be further described with respect to FIG. 6 (e.g., at 614), one or more of airflow, spark timing, and cylinder valve timing may be adjusted in order to maintain the engine torque demand and minimize torque disturbances.

At 506, it is determined if an exhaust temperature is greater than a third threshold temperature. The third threshold temperature may correspond to a non-zero, positive value temperature above which degradation of exhaust system components, such as a catalyst (e.g., emission control device 178 of FIGS. 1 and 2), may occur if the exhaust temperature is further increased. For example, the exhaust temperature may be further increased by operating the engine with lean fueling conditions or under high engine loads. The exhaust temperature may be measured by an exhaust temperature sensor coupled to an exhaust passage (e.g., temperature sensor 158 of FIGS. 1 and 2), for example. It should be understood that an exhaust over temperature condition, in which the exhaust temperature is greater than the third threshold temperature, is not the same as an overheated engine condition. For example, the exhaust over temperature condition may be present when the overheated engine condition is not present, and vice versa.

If the exhaust temperature is greater than the third threshold temperature, method 500 proceeds to 508 and includes not operating the electric boosting device. By not operating the electric boosting device, exhaust system degradation due to overheating may be prevented. Furthermore, in some examples, engine operating parameters may be adjusted to decrease the exhaust temperature. For example, rich fueling may be used in the combusting cylinders, wherein more fuel is supplied for a given air charge than needed for a chemically complete combustion event to occur (e.g., stoichiometry). The unburnt fuel absorbs a portion of the heat from the combustion event, thereby lowering the exhaust temperature.

If the exhaust temperature is not greater than the third threshold temperature (e.g., the exhaust temperature is less than or equal to the third threshold temperature), method 500 proceeds to 510 and includes operating the electric boosting device to increase airflow through the engine. The electric boosting device may be operated as described above with respect to 406 of FIG. 4. In some examples, a compressor speed of the electric boosting device may be determined based on operating conditions, such as one or more of the engine temperature, the ambient temperature, and the ambient humidity, as indicated at 512, and as described above with respect to 408 of FIG. 4. Additionally, the compressor speed may be further adjusted based on the exhaust temperature. For example, as the exhaust temperature increases, the compressor speed may be decreased. In some examples, if the exhaust temperature increases above the third threshold temperature at any point while the electric boosting device is operated, the electric boosting device may be deactivated.

At 514, it is determined if the engine temperature is greater than a second threshold temperature. As defined above with respect to FIG. 3 (e.g., at 312), the second threshold temperature may refer to a temperature above which the engine is considered to be severely overheated, and degradation may occur. Alternatively, it may be determined if a rate of temperature increase is greater than a threshold rate, as also defined above at 312 of FIG. 3. If the engine temperature is greater than the second threshold temperature (or if the rate of temperature increase is greater than the threshold rate), then intake air may be insufficient to cool the overheated engine. As such, a more aggressive engine cooling strategy may be used, and method 500 proceeds to 516 to cool the engine using liquid fuel while operating in VDE mode, as will be described with respect to FIG. 6. Following 516, method 500 ends.

If the engine temperature is not greater than the second threshold temperature at 514 (or if the rate of temperature increase is not greater than the threshold rate), method 500 proceeds to 518 and includes determining if the engine temperature is greater than a first threshold temperature. As defined above with respect to FIG. 3 (e.g., at 304), the first threshold temperature is less than the second threshold temperature and may refer to a temperature above which the engine is considered to be overheated but not severely overheated. If the engine temperature is greater than the first threshold temperature, method 500 returns to 502 to determine the number of cylinders to operate unfueled. In this way, the engine will continue to be cooled using intake air while fueling is selectively disabled, and the number of cylinders operating unfueled may be continually adjusted based on current operating conditions.

Returning to 518, if the engine temperature is not greater than the first threshold temperature (e.g., the engine temperature is less than or equal to the first threshold temperature), method 500 proceeds to 520 and includes resuming fueling to all cylinders. With fueling resumed, spark may also be resumed so that combustion may occur in all of the cylinders. Furthermore, with combustion resumed in all of the cylinders, engine operating parameters may be adjusted. As will be further described with respect to FIG. 6 (e.g., at 630), one or more of airflow, spark timing, and cylinder valve timing may be adjusted in order to maintain the engine torque demand and minimize torque disturbances when combustion resumes in all of the engine cylinders.

At 522 method 500 optionally includes deactivating the electric boosting device. For example, if the electric boosting device is being operated to provide additional airflow for cooling the engine (e.g., as at 510), then the electric boosting device will be deactivated, such as described above at 412 of FIG. 4. However, if the electric boosting device is not being operated to provide additional airflow for cooling the engine, as at 508, then 522 may be omitted. Method 500 then ends. In this way, the engine may be cooled via intake airflow through cylinders that are unfueled and not combusting while engine torque is provided via active cylinders. Furthermore, the electric boosting device may be used to provide additional airflow, thus increasing a rate of engine cooling.

Figure 6:
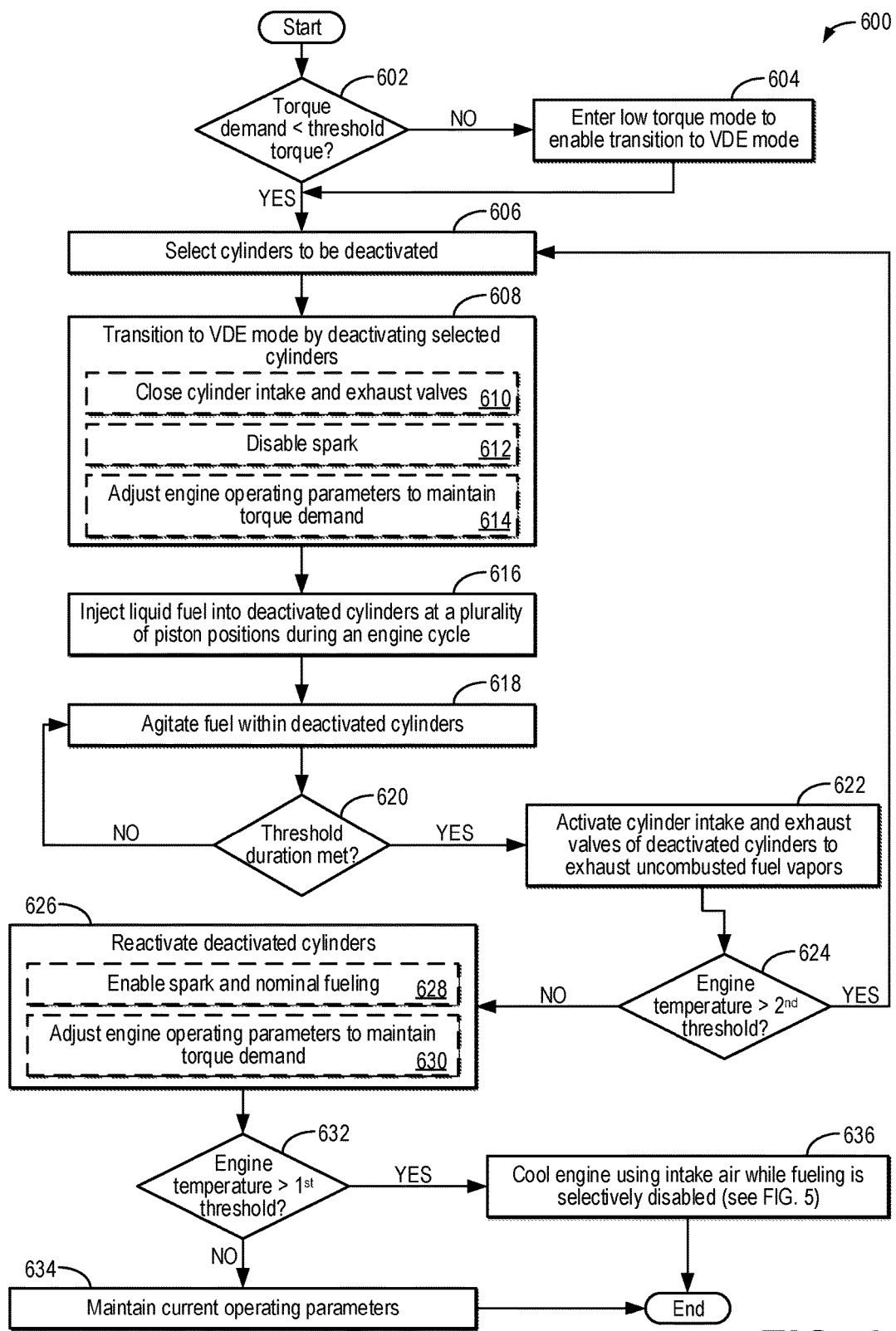
FIG. 6 shows an example method for cooling an overheated engine by selectively deactivating a subset of cylinders and injecting liquid fuel into the subset of cylinders.

Next, FIG. 6 shows an example method 600 for cooling an overheated engine using liquid fuel while operating in VDE mode. For example, method 600 may be performed to cool a direct injection variable displacement engine (e.g., engine 10 of FIGS. 1 and 2) when the engine is severely overheated, such as due to degradation of an engine cooling system (e.g., cooling system 290 of FIG. 2). FIG. 6 may be performed by a controller (e.g., controller 12 of FIGS. 1-2) as a part of method 300 of FIG. 3 (e.g., at 316) or method 500 of FIG. 5 (e.g., at 516), for example. Alternatively, method 600 may be performed responsive to any indication of an overheated direct injection variable displacement engine, particularly when air cooling methods are unable to sufficiently cool the engine.

Method 600 begins at 602 and includes determining if a torque demand is less than a threshold torque. The torque demand may be determined based on a position of an accelerator pedal, such as measured by a pedal position sensor (e.g., pedal position sensor 134 of FIG. 1), for example. The threshold torque may refer to a positive, non-zero amount of torque that cannot be met while operating in VDE mode with deactivated cylinders. For example, when the torque demand is less than the threshold torque, the torque demand may be met by the remaining active cylinders while one or more cylinders is deactivated, as further described below.

If the torque demand is not less than the threshold torque, method 600 proceeds to 604 and includes entering a low torque mode to enable the transition to operating in VDE mode. Entering the low torque mode may include decreasing the engine load. For example, the controller may determine the decreased engine load by inputting a desired lower torque (which is less than the threshold torque) and the engine speed into one or more look-up tables, algorithms, and/or maps and outputting the corresponding engine load. In some examples, a transmission (e.g., transmission 54 of FIG. 1) may be upshifted to a higher gear in order to provide the desired lower torque while reducing the engine speed and load. As another example, upshifting to the higher gear may be used to increase torque while maintaining the engine speed and load. By entering into the low torque mode, vehicle driveability and operability may be preserved while transitioning into the VDE mode for engine cooling.

If the torque demand is less than the threshold torque at 602 (or if the vehicle enters the low torque mode at 604), method 600 proceeds to 606 and includes selecting the cylinders to be deactivated. The controller may select a group of cylinders and/or an engine bank to deactivate based on the engine operating conditions (e.g., as estimated and/or measured at 302 of FIG. 3). The selection may be based on, for example, which group of cylinders was deactivated during a previous VDE mode operation. For example, if a first group of cylinders was deactivated during the previous VDE mode operation, then the controller may select a second group of cylinders (e.g., the remaining cylinders) for deactivation during the present VDE mode operation. In another example, cylinders of a first engine bank may be selected for deactivation while the cylinders of a second engine back may remain active. In still another example, hardware may restrict deactivation to select cylinders. Using a V-8 engine as an example, the hardware may restrict deactivation to two specific cylinders from each engine bank. In such an example, the controller may select the cylinders to be deactivated based on the hardware restrictions.

At 608, method 600 includes transitioning to the VDE mode by deactivating the selected cylinders. Deactivating the selected cylinders may include closing cylinder intake and exhaust valves, as indicated at 610, disabling spark, as indicated at 612, and adjusting engine operating parameters to maintain torque demand, as indicated at 614. For example, the intake and exhaust valves coupled to the selected cylinders may be fully closed and maintained closed via a cam profile switching mechanism in which a cam with no lift is used or by actuating a valve deactivator (e.g., a VDE actuator), as described further with respect to FIG. 1. In one example, exhaust gas from the previous charge burn may be trapped within the selected cylinders during the deactivation. In another example, fresh air may be trapped within the selected cylinders to provide a lower torque impulse during the deactivation by drawing air into the selected cylinders before closing the intake and exhaust valves. Disabling spark may include not actuating a spark plug (e.g., spark plug 192 of FIG. 1) coupled to each of the selected cylinders, for example. Adjusting engine operating parameters to maintain torque demand may include, for example, increasing an opening of an intake throttle (e.g., throttle 162 of FIGS. 1 and 2) to increase airflow to the active cylinders and thereby maintain torque during VDE mode. Further, spark timing may be adjusted in the active cylinders. For example, spark may initially be retarded to minimize torque disturbances during the transition to VDE mode and then restored. Further still, intake and exhaust valve timings may be adjusted for the active cylinders. For example, cam timing in the active cylinders may be modified, with camshafts positioned to achieve a desired cylinder air charge for delivering a demanded torque. Depending on demanded torque, in one example, exhaust cams may be retarded to allow exhaust residuals within active cylinders. In another example, intake cams may be advanced to enable increased volumetric efficiency in active cylinders. As such, the above adjustments may enable a desired airflow to maintain the desired engine torque.

At 616, method 600 includes injecting liquid fuel into the deactivated cylinders at a plurality of piston positions. For example, once the intake and exhaust valves are fully closed, fuel may be injected while a piston within each deactivated cylinder is at TDC (e.g., to cool the top of the cylinder), at BDC (e.g., to cool the bottom of the cylinder), and at a position intermediate TDC and BDC (e.g., 90 crank angle degrees after TDC). Injecting liquid fuel into the deactivated cylinders may include reducing an injection pressure compared with the injection pressure for providing fuel to the active cylinders. For example, at higher injection pressures, the fuel is finely atomized by the fuel injectors as it is injected, and the fine fuel droplets quickly vaporize within the cylinder. Therefore, reducing the injection pressure may include injecting fuel at a pressure that does not substantially atomize the fuel during the injection so that the fuel does not quickly vaporize within the cylinder but remains in liquid form, as liquid fuel has a greater cooling ability than vaporized fuel. For example, the reduced injection pressure may be a predetermined pressure in a range of 40-60 psi (e.g., the pressure of the fuel rail) for the deactivated cylinders (compared with greater than 2000 psi for the active cylinders), with the injection pressure further adjusted based on the specific fuel injector used. In some examples, the reduced injection pressure may be a pressure that is just above a threshold for triggering a low fuel pressure diagnostic trouble code. The liquid fuel may be injected at the reduced injection pressure by actuating the fuel injectors open at 100% duty cycle, for example.

Further, the total amount of fuel injected into each of the deactivated cylinders may be greater than the amount of fuel injected into each of the active cylinders during an engine cycle. For example, the amount of fuel injected into each of the deactivated cylinders may be a pre-calibrated value stored in a memory of the controller. In some examples, the pre-calibrated value may be further adjusted based on the engine temperature and/or the fuel volatility, with the amount of fuel injected increasing as the engine temperature and/or the fuel volatility increases until an upper threshold is reached, the upper threshold defining a maximum injection amount to prevent hydrolock. The total amount of fuel injected into each of the deactivated cylinders may be distributed between the injections at the plurality of piston positions. In one example, the total amount of fuel may be evenly distributed between each injection. In another example, a larger proportion of the total fuel amount may be injected during one or a subset of the injections, such as while the piston is at TDC.

The controller may send a series of control signals to the fuel injector of each deactivated cylinder in order to inject the appropriate amount of fuel at the appropriate piston position, each control signal having a pulse width corresponding to the amount of fuel to be injected. The controller may determine the pulse width of each signal based on the total amount of fuel to be injected, the number of injections, the distribution of fuel for each injection (e.g., a proportion of the total amount of fuel to be injected), and the injection pressure. For example, the controller may input the total amount of fuel to be injected, the number of injections, the distribution of fuel for each injection, and the injection pressure into one or more lookup tables, maps, or algorithms stored in a memory of the controller and output the pulse width and/or the timing of each control signal to send to the fuel injector of each deactivated cylinder. As an example, to prevent injected fuel from quickly vaporizing, method 600 may include injecting the fuel during the downward motion of the piston, such as during the power stroke. Similarly, fuel injection may not be performed during the upward motion of the piston, as the heat resulting from compression may quickly vaporize the liquid fuel, preventing the cooling effect of the liquid fuel. For example, the fuel injector may be actuated at 30% duty cycle when the piston is at TDC of the power stroke, at 60% duty cycle when the piston is between TDC and BDC, and at 100% duty cycle when the piston is at BDC of the power stroke, thereby increasing the amount of fuel injected as the piston moves downward.

At 618, method 600 includes agitating the fuel within the deactivated cylinders. With the intake and exhaust valves of each of the deactivated cylinders (fully) closed, the deactivated cylinders are sealed, with the piston within each deactivated cylinder continuing to move up and down as the engine spins. As such, the fuel remains within the sealed cylinder and moves over the surfaces of the cylinder and the piston head due to the motion of the piston. Agitating the fuel within the deactivated cylinders may further include monitoring for unintended combustion in the deactivated cylinders. For example, unintended combustion may occur due to compression ignition in the hot, deactivated cylinders. In one example, unintended combustion may be determined based on a signal output by an engine speed sensor (e.g., signal PIP from Hall effect sensor 120 of FIG. 1). For example, the controller may determine that unintended combustion has occurred if the engine speed accelerates in the absence of a command to increase the engine speed. In another example, unintended combustion may be determined based on a signal output by an engine knock sensor that is indicative of spontaneous combustion. As still another example, unintended combustion may be determined through a combination of the engine speed sensor output and the knock sensor output. If unintended combustion is detected, the intake and exhaust valves of the corresponding cylinder may be opened in order to exhaust the combusted gas and reduce a pressure of the corresponding cylinder.

At 620, it is determined if a threshold duration has been met. The threshold duration may refer to an amount of time that it is expected to take the liquid fuel to completely vaporize as it is agitated within the deactivated cylinders. The threshold duration may further correspond to a number of engine cycles that it is expected to take the liquid fuel to completely vaporize. After vaporizing, the cooling ability of the fuel is substantially decreased, so it may not be beneficial to continue agitating the vaporized fuel within the deactivated cylinders. In one example, the threshold duration may be a predetermined duration. Additionally or alternatively, the threshold duration may be adjusted based on one or more of the engine temperature, the engine speed, the amount of fuel injected, and the fuel volatility. For example, the controller may input the engine temperature, the engine speed, the amount of fuel injected, and/or the fuel volatility into one or more look-up tables, algorithms, or maps and output the threshold duration. As an example, as the engine temperature increases, the threshold duration may decrease. As another example, as the amount of fuel injected increases, the threshold duration may increase. As a further example, as the engine speed increases, the threshold duration may decrease. As still another example, as the fuel volatility increases, the threshold duration may decrease.

If the threshold duration has not been met, method 600 returns to 618 to continue agitating the fuel within the deactivated cylinders. In this way, the liquid fuel will continue to absorb heat from the overheated cylinders and engine until it is vaporized. If the threshold duration has been met, method 600 proceeds to 622 and includes activating the cylinder intake and exhaust valves of the deactivated cylinders to exhaust the uncombusted fuel vapors. For example, the cylinder intake and exhaust valves of the deactivated cylinders may be activated via the cam profile switching mechanism, such as by switching to a cam with lift, or by deactivating the valve deactivator. By activating the cylinder intake and exhaust valves of the deactivated cylinders, fresh charge air may enter the cylinders and the vaporized, uncombusted fuel may exit the cylinders. The vaporized fuel may be directed to a catalyst (e.g., emission control device 178 of FIGS. 1 and 2) for aftertreatment via an exhaust passage. Therefore, a temperature of the catalyst may be monitored, as treating the uncombusted fuel at the catalyst may increase a temperature of the catalyst. As an example, the temperature of the catalyst may be determined based on an exhaust gas temperature, such as measured by an exhaust gas temperature sensor coupled to the exhaust passage at an inlet of the catalyst (e.g., temperature sensor 158 of FIGS. 1-2). As another example, a temperature sensor may be directly coupled to the catalyst. If the temperature of the catalyst surpasses a threshold temperature (e.g., the third threshold temperature as described with respect to 506 of FIG. 5), the controller may adjust fueling in the active cylinders. For example, the exhaust temperature (and therefore the catalyst temperature) may be decreased via rich fueling conditions, in which more fuel is delivered to the active cylinders than for complete combustion to occur with the given cylinder air charge. Further, if the VDE engine is included in an engine system that further includes an external exhaust gas recirculation (EGR) system, a maximal amount of EGR may be used, such as by fully opening an EGR valve positioned in an EGR passage coupling the exhaust passage to an intake of the engine. In this way, a portion of the vaporized fuel may be recirculated and combusted in the active cylinders, increasing fuel economy and reducing the catalyst temperature compared to when no external EGR is used.

At 624, method 600 includes determining if the engine temperature is less than a second threshold temperature. As described with respect to FIG. 3 (e.g., at 312), the engine may be considered severely overheated when the engine temperature is greater than the second threshold temperature, and cooling via airflow may be insufficient. Therefore, if the engine temperature is greater than the second threshold temperature, the engine may continue to be cooled using liquid fuel while operating in the VDE mode, and method 600 returns to 606 and includes selecting the cylinders to be deactivated. The selected cylinders may be the same as or different from the cylinders selected during the previous VDE mode operation depending on a configuration of the variable displacement engine. For example, if the hardware does not restrict the deactivation to specific cylinders, then the cylinders that remained active during the previous VDE mode operation may be selected in order to distribute the liquid fuel cooling process throughout the cylinders. However, if only specific cylinders are deactivatable, then the same cylinders may be selected, with the remaining cylinders benefiting from peripheral cooling effects from the deactivatable cylinders due to heat diffusion.

However, when the engine temperature is less than or equal to the second threshold temperature, cooling via airflow may be preferred due to the reduced fuel economy of cooling the engine with liquid fuel while operating in VDE mode. Therefore, if the engine temperature is not greater than the second threshold temperature at 624, method 600 proceeds to 626 and includes reactivating the deactivated cylinders. Reactivating the deactivated cylinders may include, for example, enabling spark and nominal fueling, as indicated at 628, and adjusting engine operating parameters to maintain torque demand, as indicated at 630. With the intake and exhaust valves of the deactivated cylinders activated (e.g., at 622), nominal fueling may commence, such as by sending a signal to the fuel injectors with a pulse width determined based on operating conditions (e.g., engine speed, engine load) and a desired AFR. For example, the controller may input the operating conditions into one or more look-up tables, algorithms, and/or maps and output the nominal fuel injection amount and/or fuel injection timing for the input operating conditions. By enabling spark, combustion may resume in the cylinders that were deactivated during VDE mode. Furthermore, engine operating parameters may be adjusted to compensate for the reactivated cylinders to maintain engine torque. For example, the opening of the intake throttle may be decreased to allow the airflow to decrease when the cylinders are reactivated, decreasing the air charge and therefore the load to each cylinder due to more cylinders being available for combustion. In one example, the intake throttle may be adjusted to a closed position. In another example, the throttle opening may be reduced to allow sufficient airflow to the increased number of active cylinders while maintaining torque demand. At the same time, spark timing may be retarded to maintain a constant torque on all of the cylinders, thereby reducing cylinder torque disturbances. When sufficient airflow is reestablished, spark timing may be restored. In addition to throttle and spark timing adjustments, valve timing may be adjusted at 630 to compensate for torque disturbances. Cam timings may be modified to deliver desired air charges to the cylinder(s) to provide demanded torque. In one example, if the cylinder air charge is lower, exhaust cam timing may be advanced to reduce residuals and ensure complete combustion. In another example, if a higher torque is demanded, intake cams may be fully advanced and exhaust cams may be retarded to provide lower dilution and increased power.

At 632, method 600 includes determining if the engine temperature is greater than a first threshold temperature. As defined with respect to FIG. 3 (e.g., at 304), the first threshold temperature may correspond to a temperature above which the engine is considered to be overheated and is less than the second threshold temperature. If the engine temperature is not greater than the first threshold temperature (e.g., the engine temperature is less than or equal to the first threshold temperature), method 600 proceeds to 634 and includes maintaining current operating parameters. For example, with the engine temperature less than the first threshold temperature, the engine may be considered to be operating in its nominal temperature range. Therefore, the use of additional cooling strategies is not indicated. Maintaining the current operating parameters may include, for example, not transitioning to VDE mode for the purpose of engine cooling (although the engine may be transitioned to VDE mode in response to a low torque demand, for example) and not cooling the engine using intake air while fueling is selectively disabled. Following 634, method 600 ends.

Returning to 632, if the engine temperature is greater than the first threshold temperature (e.g., between the first, lower threshold temperature and the second, higher threshold temperature), method 600 proceeds to 636 and includes cooling the engine using intake air while fueling is selectively disabled, as described above with respect to FIG. 5. By cooling the engine using the intake air while fueling is selectively disabled when the engine is not severely overheated, fuel economy may be improved compared with cooling the engine with liquid fuel while operating in VDE mode. Following 636, method 600 ends.

Thus, together, the methods shown in FIGS. 3-6 provide a method for cooling an overheated engine over a variety of operating conditions and modes. In one example, the method may include determining a first engine overheating condition, and in response thereto, cooling the engine with intake airflow while cylinder fueling is selectively disabled; determining a second overheating condition, and in response thereto, cooling the engine with liquid fuel that is injected into deactivated cylinders; and determining a third engine overheating condition, and in response thereto, cooling the engine with intake airflow provided by an electric boosting device while the engine is spun unfueled via an electric motor. For example, during the first engine overheating condition, a temperature of the engine may be greater than a first, lower threshold engine temperature and less than or equal to a second, higher threshold engine temperature, and during the second engine overheating condition, the temperature of the engine may be greater than the second, higher threshold engine temperature. As another example, additionally or alternatively, a rate of engine temperature increase may be less than or equal to a threshold rate during the first engine overheating condition, and the rate may be greater than the threshold rate during the second engine overheating condition. Further still, the first and second engine overheating conditions may occur while the engine is on, with combustion occurring within the engine, and the third engine overheating condition may occur while the engine is off. Thus, during the third engine overheating condition, the temperature of the engine may be greater than the first, lower threshold engine temperature while combustion is not occurring within the engine. Therefore, a controller may make a determination of whether the first engine overheating condition, the second engine overheating condition, or the third engine overheating condition is present based on the engine temperature and/or the rate of engine temperature increase as well as an engine state (e.g., on or off).

Further, instructions stored in memory may include instructions for determining the first engine overheating condition from an engine coolant temperature sensor while combustion is occurring in the engine, and in response, cooling the engine with intake airflow while cylinder fueling is selectively disabled by instructions for sending a signal to a fuel injector coupled to each cylinder. Furthermore, in some examples, instructions stored in memory may further include instructions for sending a signal to the electric boosting device to increase the intake airflow in response to determining the first engine overheating condition. As another example, instructions stored in memory may include instructions for determining the second engine overheating condition from the engine coolant temperature sensor while combustion is occurring in the engine, and in response, cooling the engine with liquid fuel that is injected into deactivated cylinders by instructions for sending a signal to cylinder valve deactivators of each of the deactivated cylinders and a different signal to fuel injectors coupled to each of the deactivated cylinders. In still another example, instructions stored in memory may include instructions for determining the third engine overheating condition from the engine coolant temperature sensor while combustion is not occurring in the engine, and in response, cooling the engine with intake airflow while cylinder fueling is selectively disabled by instructions for sending a signal to the electric motor, coupled to a crankshaft of the engine, to spin the engine unfueled at a desired speed and sending a different signal to the electric boosting device to operate the electric boosting device at a desired speed to provide a desired airflow.

Furthermore, in some examples, the method may include instructions for selecting between performing one or more or each of cooling the engine with intake airflow while cylinder fueling is selectively disabled and cooling the engine with liquid fuel that is injected into deactivated cylinders based on a determination of whether the first engine overheating condition is present and a determination of whether the second engine overheating condition is present. As an example, the controller may differentiate between the first engine overheating condition and the second engine overheating condition based on an output of the engine coolant temperature sensor while the engine is on. As a further example, the controller may differentiate between the first engine overheating condition, the second engine overheating condition, and the third engine overheating condition based on the output of the engine coolant temperature sensor and an indication of whether the engine is on or off.

Figure 7:
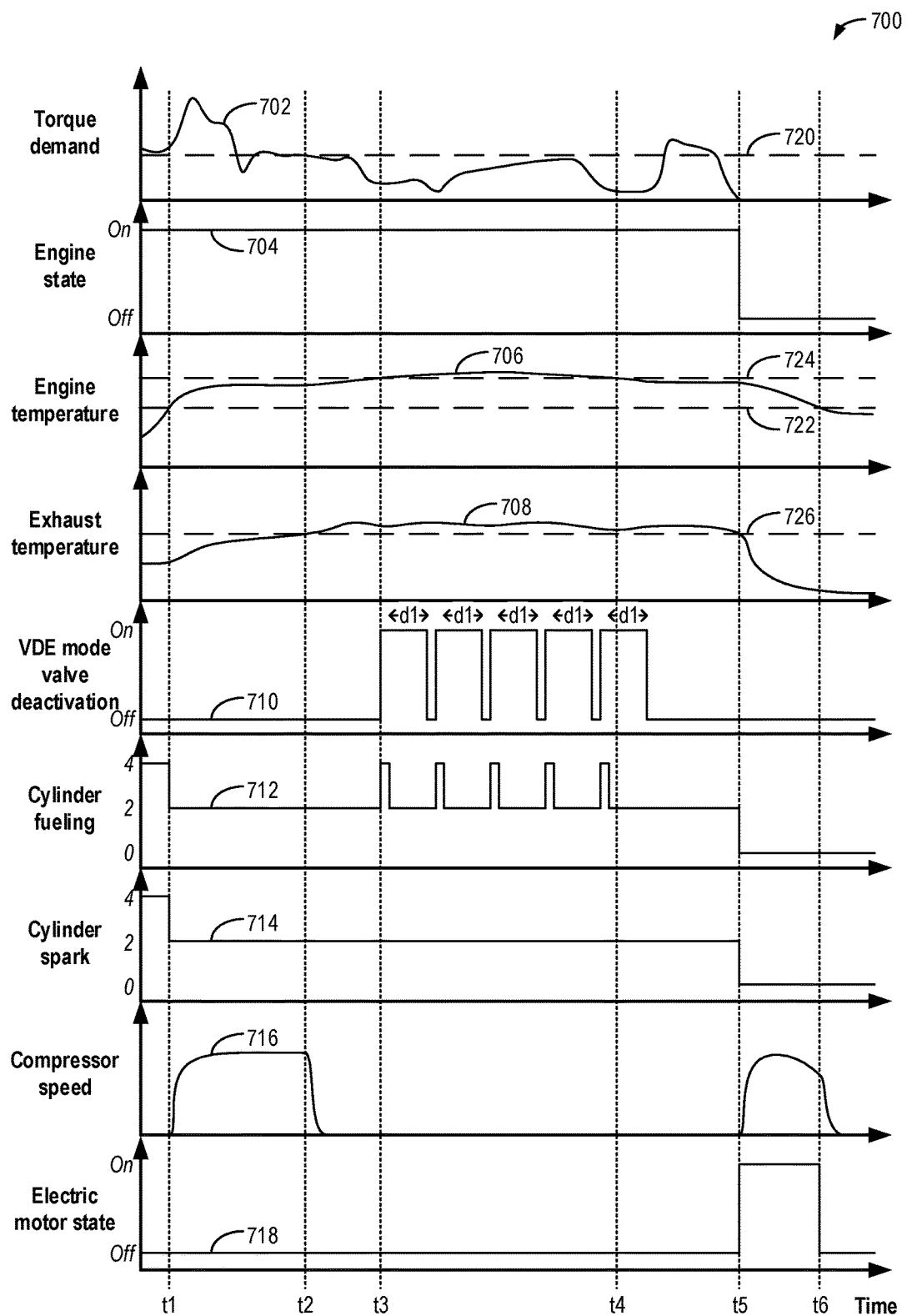
FIG. 7 shows a prophetic example timeline for cooling an overheated engine using a combination of intake airflow and liquid fuel injection based on operating conditions.

FIG. 7 shows a prophetic example timeline 700 for cooling an overheated variable displacement engine, such as engine 10 shown in FIGS. 1-2. For example, in response to an engine overheating condition, a controller (e.g., controller 12 of FIGS. 1-2) may select an appropriate cooling strategy based on operating conditions, such as according to the methods of FIGS. 3-6. Torque demand is shown in plot 702, engine state is shown in plot 704, engine temperature is shown in plot 706, exhaust temperature is shown in plot 708, VDE mode valve deactivation is shown in plot 710, cylinder fueling is shown in plot 712, cylinder spark is shown in plot 714, compressor speed is shown in plot 716, and electric motor state is shown in plot 718. For all of the above, the horizontal axis represents time, with time increasing along the horizontal axis from left to right. The vertical axis represents each labeled parameter. For plots 702, 706, 708, and 716, the labeled parameter increases along the vertical axis from bottom to top. For plots 704, 710, and 718, the vertical axis indicates whether the labeled parameter is on or off, as labeled. For plots 712 and 714, the vertical axis indicates a number (0, 2, or 4, as labeled) of cylinders receiving fuel and spark, respectively. A four-cylinder engine is used for the example of timeline 700, although other examples may include an engine with a different number of cylinders. Furthermore, a threshold torque is indicated by dashed line 720, a first threshold engine temperature is indicated by dashed line 722, a second threshold engine temperature is indicated by dashed line 724, and a threshold exhaust temperature is indicated by dashed line 726.

Prior to time t1, the engine is on and operating (e.g., with combustion occurring in engine cylinders), as shown in plot 704, in order to meet a torque demand (plot 702) from a vehicle operator. For example, the torque demand may be determined based on a position of an accelerator pedal, as described above. With the engine on and providing the demanded torque, an electric motor configured to spin the engine electrically (e.g., a starter motor or an electric machine, such as electric machine 52 of FIG. 1) is off (plot 718). The engine temperature (plot 706) is less than the first threshold engine temperature (dashed line 722). As described above with respect to FIG. 3, the engine temperature may be determined from an engine coolant temperature (e.g., measured by an engine coolant temperature sensor) or a cylinder head temperature (e.g., measured by a cylinder head temperature sensor), for example. The first threshold engine temperature, which is lower than the second threshold engine temperature (dashed line 724), defines an upper bound of a nominal engine operating temperature range, above which the engine is considered to be overheated. Therefore, prior to time t1, the engine is not overheated. Furthermore, the exhaust temperature (plot 708) is less than the threshold exhaust temperature (dashed line 726), indicating that an exhaust over temperature condition is not present. The VDE mode valve deactivation is off (plot 710), indicating that the engine is operating in non-VDE mode, with fueling (plot 712) and spark (plot 712) enabled for all of the cylinders. Furthermore, an electric boosting device (e.g., supercharger 13 of FIG. 2) is not activated, with a compressor speed of zero (plot 716). For example, the engine may be operating in a non-boosted mode or with boost provided by another boosting device (e.g., turbo charger 15 of FIG. 2).

At time t1, the engine temperature (plot 706) surpasses the first threshold engine temperature (dashed line 722), and the engine becomes overheated. For example, the engine may become overheated due to cooling system degradation, such that the cooling system (e.g., cooling system 290 of FIG. 2) is no longer able to maintain the engine temperature within the nominal operating temperature range. In response to the engine temperature surpassing the first threshold engine temperature, and further in response to the engine temperature remaining less than the second threshold engine temperature (dashed line 724), the controller executes a cooling routine using intake airflow by distributively disabling fuel injection to a determined number of cylinders, as described with regard to FIG. 5. In the example of timeline 700, fueling is disabled to two cylinders (plot 712). With no fuel provided, spark is also disabled for the corresponding two cylinders (plot 714). However, cylinder intake and exhaust valves remain active (e.g., VDE mode valve deactivation is turned off, as shown in plot 710), with intake air pumping through the disabled cylinders to cool the engine. Because the exhaust temperature (plot 708) is less than the threshold exhaust temperature (dashed line 726), the electric boosting device is operated at a compressor speed (plot 716) determined based on the operating conditions to provide a desired amount of engine cooling, for example.

Between time t1 and time t2, the intake air cooling strategy causes the engine temperature to stabilize (e.g., a rate of temperature increase is approximately equal to zero), but due to the increased airflow through the engine due to operating the electric boosting device, the exhaust temperature (plot 708) increases. At time t2, the exhaust temperature surpasses the threshold exhaust temperature (dashed line 726), above which exhaust component degradation may occur. Therefore, at time t2, the electric boosting device is deactivated, and the compressor speed decreases to zero as the compressor spins down (plot 716). As a result of the decreased cooling airflow, the amount of engine cooling becomes insufficient, and the engine temperature (plot 706) begins to increase.

At time t3, the engine temperature (plot 706) surpasses the second threshold engine temperature (dashed line 724), indicating that the engine is severely overheated. As a result, the controller executes a more aggressive cooling routine using liquid fuel while operating in VDE mode, as described with regard to FIG. 6, and the VDE mode valve deactivation is turned on (plot 710). In the example of timeline 700, two cylinders are deactivated, with their intake and exhaust valves fully closed through the VDE mode valve deactivation. Spark is not provided to the deactivated cylinders, so the number of cylinders with spark enabled remains at two (plot 714), although the two cylinders with spark enabled may be the same or different than the two cylinders with spark enabled prior to the transition to the VDE mode at time t3. After the intake and exhaust valves of the deactivated cylinders are fully closed, liquid fuel is injected into the deactivated cylinders at a plurality of piston positions until a desired amount of total fuel is injected. Thus, fueling is enabled in all four cylinders (plot 712) while the liquid fuel is injected into the deactivated cylinders and then only two cylinders (e.g., the cylinders that remain active) after the desired amount of total fuel is injected. Additionally, after the desired amount of total fuel is injected, the liquid fuel is agitated within the deactivated cylinders for a duration d1. Heat is transferred from the hot deactivated cylinders to the liquid fuel, with an increased cooling effect due to the higher thermal conductivity of the liquid fuel compared with air or vaporized fuel. As described with respect to FIG. 6, the duration d1 may be an amount of time that it is expected to take the liquid fuel to completely vaporize within the deactivated cylinders. After the duration d1 elapses, the VDE mode valve deactivation is briefly turned off (plot 710) so that the intake and exhaust valves of the deactivated cylinders open to exhaust the vaporized fuel. Spark remains disabled (plot 714). Due to the engine temperature (plot 706) remaining above the second threshold engine temperature (dashed line 724), the VDE mode valve deactivation is turned back on (plot 710), and the liquid fuel cooling process is repeated. As shown in timeline 700, the process of cooling the engine using liquid fuel while operating in the VDE mode continues to be repeated while the engine temperature remains above the second threshold engine temperature.

At time t4, the engine temperature (plot 706) drops below the second threshold engine temperature (dashed line 724). Therefore, after the duration d1 elapses and the uncombusted, vaporized fuel is exhausted from the deactivated cylinders, the VDE mode valve deactivation (plot 710) remains off. Instead of cooling the engine with liquid fuel while in the VDE mode, the engine is again cooled with intake airflow, with fueling and spark distributively disabled in two cylinders (plots 712 and 714, respectively). The electric boosting device is not activated, as the exhaust temperature (plot 708) remains above the threshold exhaust temperature (dashed line 726). Using the intake airflow for cooling, the engine temperature (plot 706) is maintained below the second threshold engine temperature (dashed line 724) but remains above the first threshold engine temperature (dashed line 722).

At time t5, the torque demand (plot 702) is reduced to zero and the engine is shut off (plot 704). In one example, the engine is shut off for an idle-stop. In another example, the vehicle is keyed off. With the engine shut off, none of the cylinders are fueled (plot 712) or provided with spark (plot 714). Because the engine temperature (plot 706) remains above the first threshold engine temperature (dashed line 722), the controller executes a routine for cooling the engine using intake airflow while the engine is spun unfueled, as described with regard to FIG. 4. The electric boosting device is operated to provide intake airflow, with the non-zero compressor speed (plot 716) determined based on operating conditions, for example. The electric motor is turned on (plot 718) to spin the engine electrically and pump the cool intake air through the unfueled engine. As described with respect to FIG. 4, the engine speed may be adjusted based on operating conditions. Heat is transferred from the overheated engine to the intake air, causing the engine temperature (plot 706) to decrease, particularly because no combustion is occurring in the engine cylinders. Without the heat from combustion, the exhaust temperature (plot 708) also decreases. At time t6, the engine temperature (plot 706) drops below the first threshold engine temperature (dashed line 722). As a result, the electric boosting device is deactivated, with the compressor speed decreasing to zero as it spins down to rest (plot 716), and the electric motor is deactivated (plot 718) to allow the engine to spin down to rest. With the engine temperature below the first threshold engine temperature, the engine is no longer considered to be in an overheated condition.

In this way, an overheated engine may be cooled with liquid fuel, increasing a rate of cooling compared to when the engine is cooled with air, particularly when air-cooling methods are ineffective. By selecting between cooling the engine using intake airflow while operating in non-VDE mode and cooling the engine with liquid fuel while operating in VDE mode based on operating conditions, the overheated engine cooling strategy may be optimized to balance faster cooling with fuel consumption based on an engine cooling demand. For example, fuel economy is increased and a rate of cooling is decreased when cooling the engine using intake airflow is selected (such as when the engine cooling demand is lower), and fuel economy is decreased and the rate of cooling is increased when cooling with the liquid fuel is selected (such as when the engine cooling demand is higher). This cooling strategy flexibility enables a controller to more aggressively cool the engine via liquid fuel when the engine is severely overheated (e.g., the cooling demand is higher), thereby preventing engine degradation from overheating, and less aggressively cool the engine via intake airflow while the engine is overheated but not severely overheated (e.g., the cooling demand is lower), thereby reducing fuel consumption. Overall, the overheated engine may be more effectively cooled than when the engine is only cooled via intake airflow while cylinder fueling is selectively disabled.

The technical effect of cooling an overheated engine by injecting liquid fuel into a sealed, deactivated cylinder is that a rate of engine temperature decrease is greater than when liquid fuel is not injected.

As one example, a method comprises: deactivating a subset of cylinders of a multiple cylinder engine based on a temperature of the engine; and directly injecting fuel into each of the subset of cylinders during the deactivation. In the preceding example, the deactivating the subset of cylinders based on the temperature of the engine additionally or optionally further comprises operating with the engine temperature greater than a threshold temperature, and in response to the engine temperature being greater than the threshold temperature, deactivating the subset of cylinders; and operating with the engine temperature less than or equal to the threshold temperature, and in response to the engine temperature being less than or equal to the threshold temperature, not deactivating the subset of cylinders. In any or all of the preceding examples, the method additionally or optionally further comprises an intake valve, an exhaust valve, and a spark plug coupled to each cylinder, and wherein the deactivating includes fully closing the intake valve and the exhaust valve of each of the subset of cylinders and disabling sparking of the spark plug of each of the subset of cylinders so that the injected fuel is not combusted. In any or all of the preceding examples, the method additionally or optionally further comprises, after a threshold time duration of the deactivation is reached, activating the intake valve and the exhaust valve coupled to each of the subset of engine cylinders; and exhausting the injected fuel. In any or all of the preceding examples, the method additionally or optionally further comprises, after exhausting the injected fuel, enabling sparking of the spark plug coupled to each of the subset of cylinders in response to the engine temperature being less than or equal to the threshold temperature. In any or all of the preceding examples, additionally or optionally, directly injecting the fuel into the subset of cylinders during the deactivation includes performing fuel injections via a fuel injector coupled to each of the subset of cylinders each time a piston within each of the subset of cylinders is at a plurality of predefined positions. In any or all of the preceding examples, additionally or optionally, the plurality of predefined positions includes top dead center, bottom dead center, and a position between top dead center and bottom dead center. In any or all of the preceding examples, additionally or optionally, directly injecting the fuel into the subset of cylinders during the deactivation further includes reducing an injection pressure compared to the injection pressure outside of the deactivation, and wherein an amount of fuel injected during the deactivation is greater than the amount of fuel injected outside of the deactivation.

As a second example, a method comprises: in response to overheating of a multi-cylinder engine and based on operating conditions, selecting between cooling the engine via flowing air through one or more of the engine cylinders while disabling fueling of the one or more engine cylinders and fueling a subset of the engine cylinders with liquid fuel that is not combusted while deactivating the intake and exhaust valves of each of the subset of engine cylinders. In the preceding example, additionally or optionally, the one or more of the engine cylinders may be either the same as or different cylinders than the subset of the engine cylinders, and the engine overheating condition is determined based on an engine temperature and is independent of an exhaust temperature. In any or all of the preceding examples, additionally or optionally, the operating conditions include the engine temperature and an engine status (e.g., "on" or "off"), and the selecting additionally or optionally further comprises: cooling the engine via flowing air through the one or more of the engine cylinders while disabling fueling of the one or more engine cylinders in response to the engine temperature being greater than a first, lower threshold temperature while the engine is off; cooling the engine via flowing air through the one or more of the engine cylinders while disabling fueling of the one or more engine cylinders in response to the engine temperature being greater than a first, lower threshold temperature and less than or equal to a second, higher threshold temperature while the engine is on; and cooling the engine via fueling the subset of the engine cylinders with liquid fuel that is not combusted while deactivating the intake and exhaust valves of each of the subset of engine cylinders in response to the engine temperature being greater than the second, higher threshold temperature while the engine is on. In any or all of the preceding examples, the method additionally or optionally further comprises an electric boosting device coupled to an intake of the engine, and wherein cooling the engine via flowing air through the one or more of the engine cylinders while disabling fueling of the one or more engine cylinders includes operating a compressor of the electric boosting device at a desired speed determined based on at least one of the engine status, the engine temperature, and the exhaust temperature. In any or all of the preceding examples, the method additionally or optionally further comprises an electric motor configured to electrically spin the engine, and wherein cooling the engine via flowing air through the one or more of the engine cylinders while disabling fueling of the one or more engine cylinders while the engine is off includes disabling fueling to all of the engine cylinders and spinning the engine electrically. In any or all of the preceding examples, additionally or optionally, cooling the engine via flowing air through the one or more of the engine cylinders while disabling fueling of the one or more engine cylinders while the engine is on includes disabling fueling to a determined number of engine cylinders while enabling fueling to a remaining number of engine cylinders, and wherein the engine cylinders selected for the determined number of engine cylinders changes at predetermined times. In any or all of the preceding examples, additionally or optionally, cooling the engine via fueling the subset of the engine cylinders with liquid fuel that is not combusted while deactivating the intake and exhaust valves of each of the subset of engine cylinders comprises: fully closing the intake and exhaust valves of each of the subset of engine cylinders; disabling spark plugs coupled to each of the subset of engine cylinders; injecting a desired amount of liquid fuel into each of the subset of engine cylinders over a plurality of injections; maintaining the intake and exhaust valves of each of the subset of engine cylinders fully closed for a duration after completing the plurality of injections to allow the liquid fuel to vaporize as it absorbs heat from the engine; and opening the intake and exhaust valves of each of the subset of engine cylinders to exhaust the vaporized fuel after the duration elapses.

As a third example, a system comprises: an engine including a plurality of cylinders coupled to a crankshaft, each cylinder including a piston, an intake valve, an exhaust valve, a spark plug, and a fuel injector coupled directly thereto; a fuel system configured to deliver pressurized fuel from a fuel tank to the fuel injector; a first electric motor coupled to the crankshaft receiving electrical power from a system battery; a supercharger compressor coupled to the intake of the engine and driven by a second electric motor receiving electrical power from the system battery; a temperature sensor for estimating an engine temperature; a temperature sensor coupled to an exhaust passage of the engine upstream of an emission control device; and a controller storing executable instructions in non-transitory memory that, when executed, cause the controller to: during an engine overheating condition and while the engine is on, perform each of cooling the engine using intake airflow while fueling is selectively disabled to a number of cylinders and cooling the engine using liquid fuel injected into each of a subset of cylinders that are deactivated while operating in a variable displacement engine (VDE) mode under different operating conditions; and during the engine overheating condition and while the engine is off, cool the engine using airflow from the supercharger compressor while spinning the engine unfueled via the first electric motor. In the preceding example, additionally or optionally, the overheating condition includes the engine temperature being greater than a lower threshold temperature, and the different operating conditions include a first operating condition in which the engine temperature is less than or equal to a higher threshold temperature and a second operating condition in which the engine temperature is greater than the higher threshold temperature. In any or all of the preceding examples, additionally or optionally, cooling the engine using the intake airflow while the fueling is selectively disabled to the number of cylinders is performed during the first operating condition, and cooling the engine using the liquid fuel injected into each of the subset of cylinders that are deactivated while operating in the VDE mode is performed during the second operating condition. In any or all of the preceding examples, cooling the engine using the intake airflow while the fueling is selectively disabled to the number of cylinders additionally or optionally further comprises: determining the number of cylinders to operate unfueled based on at least one of engine speed, the engine temperature, a rate of increase of the engine temperature, and a torque demand; disabling fuel injection to the determined number of cylinders in a distributive fashion; and operating the supercharger compressor at a speed determined based on at least one of the engine temperature, the rate of increase of the engine temperature, and an exhaust temperature measured by the temperature sensor coupled to the exhaust passage. In any or all of the preceding examples, cooling the engine using liquid fuel injected into each of the subset of cylinders that are deactivated while operating in the VDE mode additionally or optionally further comprises: deactivating the subset of the cylinders by maintaining the intake valve and the exhaust valve coupled to each of the subset fully closed and disabling the spark plug coupled to each of the subset; injecting fuel into each of the subset at a plurality of piston positions and at an injection pressure that is less than the injection pressure of the cylinders that remain active; and agitating the fuel within the subset of the cylinders for a duration before opening the intake valve and the exhaust valve of each of the subset to exhaust the fuel.

In another representation, a method comprises: in response to an engine overheating condition, selecting between cooling the engine via intake airflow while selectively disabling cylinder fueling and via liquid fuel that is not combusted in the engine while selectively deactivating cylinder intake and exhaust valves. In the preceding example, additionally or optionally, the engine overheating condition is based on an engine temperature and is independent of an exhaust temperature, and the selecting is based on operating conditions including one or more of the engine temperature and an operational state of the engine. In any or all of the preceding examples, additionally or optionally, the operational state of the engine includes an engine-off state, in which combustion does not occur in engine cylinders, and an engine-on state, in which combustion occurs in at least one engine cylinder. In any or all of the preceding examples, the selecting additionally or optionally further comprises: during the engine-off state, cooling the engine via the intake airflow while selectively disabling the cylinder fueling in response to the engine temperature being greater than a first, lower threshold temperature; and, during the engine-on state, selecting between cooling the engine via the intake airflow while selectively disabling the cylinder fueling and cooling the engine via liquid fuel that is not combusted in the engine while selectively deactivating the cylinder intake and exhaust valves based on the engine temperature. In any or all of the preceding examples, additionally or optionally, during the engine-on state, cooling the engine via the intake airflow while selectively disabling the cylinder fueling is selected in response to the engine temperature being greater than the first, lower threshold temperature and less than or equal to a second, higher threshold temperature; and cooling the engine via liquid fuel that is not combusted in the engine while selectively deactivating the cylinder intake and exhaust valves is selected in response to the engine temperature being greater than the second, higher threshold temperature. In any or all of the preceding examples, the method additionally or optionally further comprises an electric boosting device coupled to an intake of the engine, and wherein at least a portion of the intake airflow used for cooling the engine is generated by the electric boosting device. In any or all of the preceding examples, the method additionally or optionally further comprises an electric motor configured to electrically spin the engine, and wherein cooling the engine via the intake airflow while selectively disabling the cylinder fueling during the engine-off state includes spinning the engine unfueled via the electric motor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine system, comprising:
   in response to an overheating condition of a multi-cylinder engine and based on additional operating conditions, selecting, via a controller, between cooling the engine via air flow through the engine and cooling the engine via liquid fuel;
   in response to selecting cooling the engine via air flow through the engine, flowing air through one or more engine cylinders while disabling fueling of the one or more engine cylinders; and
   in response to selecting cooling the engine via liquid fuel, fueling a subset of engine cylinders with liquid fuel that is not combusted while deactivating intake and exhaust valves of each of the subset of engine cylinders.

2. The method of claim 1, wherein the one or more engine cylinders may be either the same as or different cylinders than the subset of the engine cylinders, and the overheating condition is determined by the controller based on an engine temperature received via an engine temperature sensor and is independent of an exhaust temperature.

3. The method of claim 2, wherein the overheating condition includes the engine temperature being greater than a first, lower threshold temperature, and the additional operating conditions include the engine temperature relative to a second, higher threshold temperature and an engine status, including one of off and on, and the selecting comprises:
   the controller selecting cooling the engine via air flow through the engine in response to the engine status being off;
   the controller selecting cooling the engine via air flow through the engine in response to the engine temperature being less than or equal to the second, higher threshold temperature and the engine status being on; and
   the controller selecting cooling the engine via liquid fuel in response to the engine temperature being greater than the second, higher threshold temperature and the engine status being on.

4. The method of claim 3, wherein cooling the engine via air flow through the engine includes the controller operating a compressor of an electric boosting device coupled to an intake of the engine at a desired speed determined by the controller based on at least one of the engine status, the engine temperature, and the exhaust temperature.

5. The method of claim 3, wherein cooling the engine via air flow through the engine in response to the engine status being off includes the controller disabling fueling to all engine cylinders and spinning the engine electrically via an electric motor coupled to the engine.

6. The method of claim 3, wherein cooling the engine via air flow through the engine in response to the engine temperature being less than or equal to the second, higher threshold temperature and the engine status being on includes the controller disabling fueling of the one or more engine cylinders while enabling fueling to a remaining number of engine cylinders, and wherein the engine cylinders selected for the one or more engine cylinders change at predetermined times.

7. The method of claim 3, wherein cooling the engine via liquid fuel comprises:
  fully closing the intake and exhaust valves of each of the subset of engine cylinders;
  disabling spark plugs coupled to each of the subset of engine cylinders;
  injecting a desired amount of liquid fuel into each of the subset of engine cylinders over a plurality of injections, the desired amount determined by the controller;
  maintaining the intake and exhaust valves of each of the subset of engine cylinders fully closed for a duration after completing the plurality of injections; and
  opening the intake and exhaust valves of each of the subset of engine cylinders after the duration elapses.

* * * * *